US009900229B2

(12) United States Patent
Kaal

(10) Patent No.: US 9,900,229 B2
(45) Date of Patent: Feb. 20, 2018

(54) NETWORK-CONNECTIVITY DETECTION

(71) Applicant: Microsoft Technology Licensing, LLC, Redmond, WA (US)

(72) Inventor: Madis Kaal, Tallinn (EE)

(73) Assignee: Microsoft Technology Licensing, LLC, Redmond, WA (US)

(*) Notice: Subject to any disclaimer, the term of this patent is extended or adjusted under 35 U.S.C. 154(b) by 190 days.

(21) Appl. No.: 15/010,455

(22) Filed: Jan. 29, 2016

(65) Prior Publication Data

US 2017/0222900 A1    Aug. 3, 2017

(51) Int. Cl.
*G06F 15/16* (2006.01)
*H04L 12/26* (2006.01)

(52) U.S. Cl.
CPC ......... *H04L 43/0811* (2013.01); *H04L 43/10* (2013.01)

(58) Field of Classification Search
USPC ............... 709/224, 201, 202, 220, 227, 238
See application file for complete search history.

(56) References Cited

U.S. PATENT DOCUMENTS

| | | | |
|---|---|---|---|
| 7,697,512 B1 | 4/2010 | Allison, III et al. | |
| 7,711,800 B2 | 5/2010 | Gavrilescu et al. | |
| 7,856,574 B2 | 12/2010 | Johnson et al. | |
| 7,860,982 B2 | 12/2010 | Finkelstein et al. | |
| 8,332,513 B2 | 12/2012 | Wen et al. | |
| 8,392,585 B1 | 3/2013 | Balwani | |
| 8,433,798 B2 | 4/2013 | Smith et al. | |
| 8,812,579 B2* | 8/2014 | Rivera | H04L 63/0227 705/38 |
| 2001/0012271 A1* | 8/2001 | Berger | H04L 12/5602 370/230 |
| 2002/0078133 A1* | 6/2002 | Nagano | G06F 17/30876 709/201 |
| 2002/0116491 A1 | 8/2002 | Boyd et al. | |
| 2006/0127094 A1* | 6/2006 | Kwak | H04J 14/0227 398/89 |
| 2009/0019145 A1 | 1/2009 | Nakanishi et al. | |
| 2013/0155876 A1 | 6/2013 | Potra et al. | |
| 2013/0250780 A1 | 9/2013 | Meylan et al. | |
| 2014/0215062 A1 | 7/2014 | Anugu | |

(Continued)

OTHER PUBLICATIONS

"International Search Report and Written Opinion Issued in PCT Application No. PCT/US2017/013634", dated Mar. 30, 2017, 14 Pages.

(Continued)

*Primary Examiner* — Jude Jean Gilles
(74) *Attorney, Agent, or Firm* — Talem IP Law, LLP

(57) ABSTRACT

A state of network connectivity of a network interface can be determined by transmitting, via a network interface, requests having respective destinations. A computing device can determine that respective results corresponding to the requests include at least some inconsistent results. A further request can be transmitted having a respective destination. A state of network connectivity of the network interface can be determined based at least in part on a result corresponding to the further request and at least one of the inconsistent results. Destinations can be selected based on respective priority values. An indication can be transmitted of a destination that does not correspond to the state of network connectivity.

20 Claims, 15 Drawing Sheets

(56) References Cited

U.S. PATENT DOCUMENTS

2014/0254390 A1     9/2014    Ansley et al.
2014/0379894 A1    12/2014    Allen et al.

OTHER PUBLICATIONS

Dondyk, et al., "Denial of Convenience Attack to Smartphones Using a Fake Wi-Fi Access Point", A Thesis Submitted in Partial Fulfillment of the Requirements for the Honors in the Major Program in Mechanical Engineering in the College of Engineering and Computer Science and in the The Burnett Honors College at the University of Central Florida, 2012, 28 Pages.

"Configure Corporate Connectivity Detection Settings," retrieved Dec. 21, 2015 at <<https://technet.microsoft.com/en-us/library/ee649225(v=ws.10).aspx>>, Published Oct. 7, 2009.

Graham, R., "Apple's Secret "wispr" request," Published on Sep. 6, 2010, available at <<http://blog.erratasec.com/2010/09/apples-secret-wispr-request.html#.Vm-v067zrcs>>.

"Network Portal Detection—The Chromium Projects," retrieved Dec. 21, 2015 at <<https://www.chromium.org/chromium-os/chromiumos-design-docs/network-portal-detection>>, Published Jul. 7, 2012.

"Ping any URL or web site with our free command-line utility, http-ping," retrieved Dec. 15, 2015 at <<http://www.coretechnologies.com/products/http-ping/>>, Published Feb. 17, 2008.

Platts, M., "The Network Connection Status Icon," retrieved on Dec. 21, 2015 at <<http://blogs.technet.com/b/networking/archive/2012/12/20/the-network-connection-status-icon.aspx>>, Published Dec. 20, 2012.

\* cited by examiner

NETWORK-CONNECTIVITY DETECTION

BACKGROUND

Many computing devices are able to connect to networks not under their control. For example, many smartphones, tablets, laptop computers, and other personal computing devices can connect to wireless networks such as open WIFI networks. Additionally, some such devices can connect via wired Ethernet connections to networks operated by hotels or business centers. Furthermore, many computing devices, such as smartphones, can connect to multiple networks simultaneously, and select one or more of those networks to carry data of a particular connection.

SUMMARY

This disclosure describes systems, methods, and computer-readable media for determining a state of network connectivity of a network interface. In some examples, even when the network interface is receiving network service, the network service may not provide network connectivity to one or more destinations. In some examples, a computing system can transmit, via the network interface, a plurality of requests having respective destinations. The computing system can determine that results corresponding to the requests include at least some inconsistent results (e.g., that one result indicates the computing system has full network connectivity and another result indicates the computing system as limited network connectivity). The computing system can transmit, via the network interface, a further request having a respective destination. The computing system can determine a state of network connectivity of the network interface based at least in part on a result corresponding to the further request and at least one of the inconsistent results (e.g., by majority vote among the results).

According to example techniques described herein, the computing system can determine that a selected destination of a plurality of network destinations, e.g., first, second, and third destinations, does not correspond to the state of network connectivity, and transmit an indication of the selected destination via a network. According to example techniques described herein, a first destination indication can be selected from among multiple destination indications based at least in part on at least one of a multiple priority values corresponding to the destination indications. Some example techniques described herein can permit more robustly or efficiently determining the state of network connectivity.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic, or operations as permitted by the context described above and throughout the document.

BRIEF DESCRIPTION OF THE DRAWINGS

The same numbers are used throughout the drawings to reference like features and components. The drawings are not necessarily to scale.

DETAILED DESCRIPTION

Overview

Figure 1:
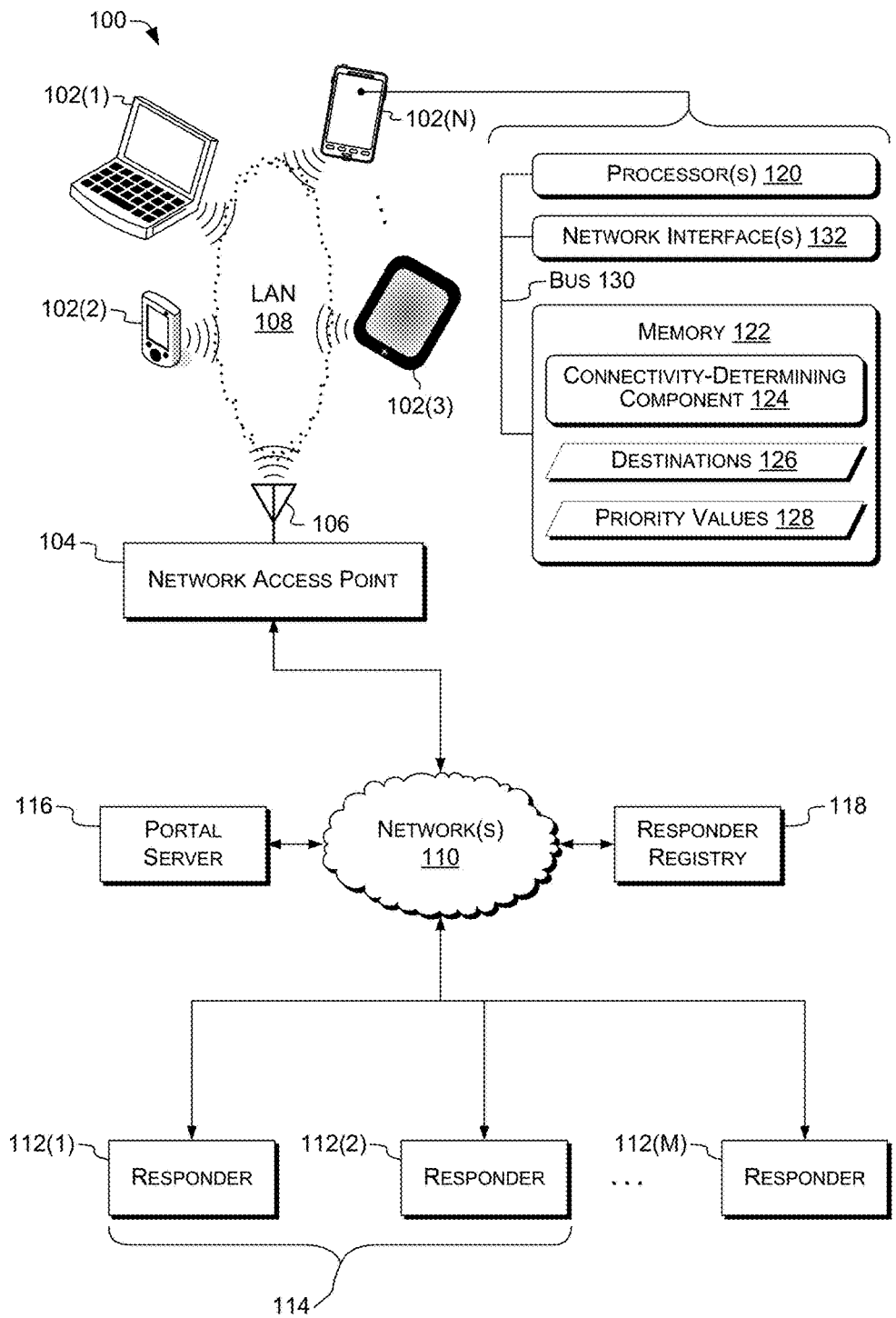
FIG. 1 is a block diagram depicting an example environment for implementing connectivity-state detection as described herein.

Users desire reliable network connectivity from their network-capable computing devices, such as smartphones. Smartphones can provide network connectivity via, e.g., cellular networks or other wireless networks such as WIFI networks. Since cellular networks are often more expensive than WIFI networks, users often prefer to use WIFI connections whenever possible. Smartphones, cellular networks, and WIFI networks are used for clarity of illustration and are not limiting. Numerous other types of wireless devices may also be used in accordance with the techniques described herein.

Many airports, hotels, restaurants, and other business or residential locations include hotspots having WIFI Wireless Access Points (WAPs). WAPs may be located at a store, enterprise, point of interest or other location (referred to generically herein as a "hotspot") to provide wireless service to nearby computing devices. "Open" WAPs provide wireless network service to any computing device within range. "Closed" WAPs provide wireless network service only to computing devices that provide authorization information. Authorization information can include, e.g., a WIFI key used for encryption and authentication, a username and password, or an access token provided, e.g., by an operator of the hotspot. As used herein, "network service" refers to a connection between a computing device and a network access device such as a WAP or an Ethernet switch. Network service can be provided via various types of networks, e.g., WIFI, ZIGBEE, Ethernet, near-field communications techniques (NFC), cellular data networks such as LTE networks or WIMAX networks, or other personal-area, local-area, wide-area, or metropolitan-area networks.

However, even on open WAPs (or other open network access devices, and likewise throughout the document), wireless network service does not guarantee network connectivity. Some WAPs permit access only to pre-selected network servers (or services, and likewise throughout the document), such as the WAP vendor's Web site or the hotspot owner's Web site. This is referred to as a "walled garden" configuration. Additionally or alternatively, some WAPs require users to interact with a captive portal, often presented as a Web page, before permitting access to servers other than the captive portal (or sites permitted by a walled garden). Captive portals can require users to enter credentials or agree to terms of service before permitting network connectivity to such servers or services. Many implementations of captive portals respond to any attempt to access a server with the hypertext markup language (HTML) source of the captive portal's main Web page. In this way, whenever a user attempts to access a Web page, the captive portal will appear. For example, a hotel may provide WIFI network service to its guests, but require entry of an access token, e.g., a guest's room number, in a captive-portal interface before providing network connectivity to destinations other than those controlled by the hotel.

As used herein, a state of network connectivity of a network interface indicates the degree to which a network-capable computing device can, without specific authorization by the WAP or other network service provider, establish network connections via that network interface to servers selected by the network-capable computing device. For example, walled gardens restrict network connectivity to only specific sites approved by the network service provider. Therefore, a computing device connected via a walled garden has a different state of network connectivity than a computing device connected via an unrestricted network. Similarly, captive portals restrict network connectivity to, in some examples, only the captive portal. As a result, network service does not guarantee desired states (e.g., levels) of network connectivity. As used herein, "network connectivity" does not refer to non-local restrictions on network access such as those due to failures at the server or to intervening black holes, firewalls, or filters. Examples of such restrictions are discussed below with reference to FIG. 2. A computing device may have multiple network interfaces having different states of network service or network connectivity. For example, a cellular network interface and a WIFI network interface may both have network service, but the cellular network interface may have unrestricted network connectivity while the WIFI network interface has restricted network connectivity.

In order to provide reliable network connectivity, many smartphones transmit data primarily over a cellular network, and only use a WIFI network once the smartphone has determined the WIFI network provides acceptable network connectivity. A common way of making that determination is to query a predetermined destination. This querying is referred to as "probing." As used herein, a "destination" is an identifiable recipient of network traffic. A destination can include a network-connected peer, e.g., a server or client. Network traffic for a particular destination can be handled by one server or by one or more servers of a group of servers. For example, packets to an anycast IP address (a destination) can be handled by any peer reachable at that IP address. In another example, a particular hostname (a destination) associated with a content delivery network (CDN) can resolve to multiple network addresses. Traffic for a host of that particular hostname can be handled by any peer associated with any of those network addresses.

In an example of probing, a computing device using the MICROSOFT WINDOWS operating system may transmit a hypertext transfer protocol (HTTP) GET request to uniform resource locator (URL)<URL:http://www.msftncsi.com/ncsi.txt> via a WIFI network providing wireless network service. Similarly, an APPLE computing device such as an IPHONE may transmit a GET request to <URL:http://www.apple.com/library/test/success.html>. If the WINDOWS computing device receives an HTTP 200 OK response with the 14-byte contents "Microsoft NCSI", the computing device may determine that the WIFI network is providing a desired state of network connectivity. Similarly, if the IPHONE computing device receives a response containing the word "Success", the IPHONE may determine that the WIFI network is providing the desired state of network connectivity. If the computing device is not able to look up a network address for the desired server (e.g., www.msftncsi.com), is not able to connect to that server, is not able to transmit the request, does not receive a complete response, or receives a response not matching the expected response, the computing device can determine that the WIFI network does not provide the desired state of network connectivity.

A computing device connected to a WIFI network providing the desired state of connectivity can use the WIFI network instead of the cellular network whenever the type of network transmission permits. Using the WIFI network in such situations may reduce users' wireless-data costs, provide reduced latency, or provide increased throughput, compared to using the cellular network. A computing device not connected to a WIFI network providing the desired state of connectivity can use the cellular network for data connections. Doing so may reduce the occurrence of dropped or interrupted network connections.

However, although each probe generally involves transferring only a relatively small amount of data, a server such as www.msftncsi.com that responds to probes from multiple computing devices, e.g., located throughout the world, may experience very high bandwidth load due to probing. Similarly, a captive portal server that is handling intercepted probe queries may experience very high load. In order to mitigate this load, some hotspot operators provide full network connectivity to known probe servers or other destinations such as the MICROSOFT and APPLE probing servers described above. This practice is referred to as "pin-holing." Some hotspot operators also pin-hole probe servers in order to guarantee that a user interacts with a captive-portal server through a full-function Web browser rather than an interface provided by the operating system. In some examples of pin-holing, probe queries can bypass a captive-portal server, e.g., as described below with reference to FIGS. 1 and 2. In some examples of pin-holing, probe queries can pass through a captive-portal server, which can then forward the probe queries to their intended destinations, e.g., based at least in part on configuration information.

A computing device that has wireless service provided by an operator that pin-holes that device's probe destinations may determine that network connectivity is acceptable, e.g., as described above, and attempt to use WIFI for network connections. However, those network connections may still be subject to walled-garden or captive-portal restrictions, causing network applications to fail due to lack of connectivity. Moreover, pin-holing can effectively prohibit users from using network applications other than a Web browser before being authorized by the captive portal. This can reduce user productivity since, in an environment implementing pin-holing, it may not be readily apparent to the user that the cause of network-related failures in, e.g., a chat or calendaring application, is a need to provide authorization information to a captive-portal server. As used herein, "whitelisted" servers or protocols are servers or protocols to which a pin-holing, walled-garden, or captive-portal implementation permits access, e.g., without requiring credentials such as a hotel room number, a username and password, or other authorization information.

Some prior schemes for determining network connectivity use only a single probe, such as a connection to a probe URL described above. Such schemes cannot detect pin-holing of the single probe URL used. Therefore, such prior schemes may attempt to use WIFI for connections to destinations not reachable via WIFI. This can cause users to experience extended delays while applications attempt to reach servers, can cause data loss or corruption due to unexpected interruption of network connections, or can render applications inoperative due to inability to communicate with application servers.

Moreover, an entity such as a vendor of an operating system (OS) running on a computing device 102, e.g., MICROSOFT or GOOGLE, may desire to use multiple probe servers to reduce the probing-traffic load on any one server. Some vendors use CDNs to permit a single network name, e.g., "www.msftncsi.com," to map to one of several servers, e.g., 74.202.215.25 or 74.202.215.16. For example, a CDN can receive a request from a particular client and assign a server near that particular client to respond to the request. "Nearness" can be measured, e.g., geographically or by number of network hops between a server of the CDN and the particular client. However, some prior schemes are limited to a single CDN. This can restrict the OS vendor's flexibility in balancing load.

Accordingly, some example techniques described herein provide techniques and constructs to determine a state of network connectivity of a network interface. Some example techniques probe multiple servers and determine connectivity based on comparisons of the results of multiple probes. This can permit, e.g., detecting pin-holing. Some example techniques determine which servers to probe based on priority values. This can permit, e.g., improved balancing of load across multiple servers or across multiple CDNs. Some example techniques determine which of multiple probed servers is providing inaccurate results, and report the identity of that server to, e.g., the OS vendor. This can permit the OS vendor to more effectively allocate servers to, e.g., geographic regions or other areas having specific restrictions on connection.

Example techniques described herein can enable computing devices to select an appropriate network for data communications in progress, e.g., when moving into or out of a particular wireless network's coverage area. Selecting appropriate networks can reduce the probability of dropped connections or data loss, and can improve usability of network-centric applications. Example techniques herein can detect pin-holing and determine the state of network connectivity even in the presence of pin-holing.

Some example techniques described herein can reduce network bandwidth consumption and processor usage associated with attempts to connect via networks having reduced network connectivity. Reducing bandwidth consumption can increase network throughput for a particular computing device or for other computing devices connected to a same network as the particular computing device. Reducing processor usage can save power, increasing battery life of portable computing devices. Some example techniques herein can provide information about a particular network service, e.g., a particular hotspot, permitting computing devices to adjust probing operation according to the characteristics of network service experienced by other users of a particular network service.

Some example scenarios and example techniques for network-connectivity detection are presented in greater detail in the following description of the figures. As noted above, various examples are presented with reference to cellular data networks providing full network connectivity and WIFI networks providing limited network connectivity (e.g., captive-portal or walled-garden configurations). However, these examples are not limiting. In some examples, a cellular data network may be configured with a captive portal or walled garden, or a WIFI network may be configured to provide full network connectivity.

Illustrative Environment

FIG. 1 shows an example environment 100 in which examples of network-connectivity-determining systems can operate or in which methods for determining network connectivity such as described below can be performed. In the illustrated example, various devices or components of environment 100 include computing devices 102(1)-102(N) (individually or collectively referred to herein with reference 102), where N is any integer greater than or equal to 1, depicted as portable computing devices. Computing device 102 represents any type of device that can communicate via a network. Computing device 102 can be implemented as, for example, but without limitation, a laptop (e.g., 102(1)), a personal digital assistant (PDA) (e.g., 102(2)), a tablet computer such as a MICROSOFT SURFACE or APPLE IPAD (e.g., 102(3)), a smartphone such as a MICROSOFT LUMIA (e.g., 102(4)), a feature phone, a smart watch, a network-connectable biometric device such as a fitness tracker, a virtual-reality (VR) or augmented-reality (AR) display such as GOOGLE GLASS or other displays or computing systems, e.g., configured to be worn on the head, wrist, or another part of the body, a network-connectable sensor or actuator, a robot, an network-enabled television, a television set-top box (cable or otherwise, e.g., an APPLE TV), a game console, a portable gaming system, a desktop computer, or a server. Different devices or types of devices can have different uses for network connectivity information. For example, smartphone 102(N) can use network connectivity information to determine which wireless network to use for new connections to destinations. Laptop computer 102(1) can use network connectivity information to determine whether the laptop computer is connected to a corporation's private network or to a public network, and to adjust security settings accordingly.

In the illustrated example, computing devices 102 receive wireless service from network access point (NAP) 104. In the illustrated example, NAP 104 is a WAP having antenna 106. For example, NAP 104 can host a local network 108, e.g., an Ethernet or WIFI local-area network (LAN). NAP 104 is connected via one or more network(s) 110, e.g., the Internet, to one or more responders 112(1)-112(M) (individually or collectively referred to herein with reference 112), where M is any integer greater than or equal to 1. Responders can include, e.g., Web servers such as servers responding to queries to www.msftncsi.com, other computing devices 102, or other computing devices configured to receive and respond to probe queries. In the illustrated example, responders 112(1) and 112(2) are part of CDN 114. At least when a desired state of network access is provided by NAP 104, computing devices 102 can communicate with responders 112 via NAP 104 and networks 110.

In the illustrated example, NAP 104 is also connected to a portal server 116, e.g., via networks 110. Portal server 116 can additionally or alternatively be included in, or bundled or co-located with, NAP 104. One portal server 116 can communicate with one or more NAPs 104, and one NAP 104 can communicate with one or more portal servers 116. Portal server 116 can include, a Web server responding to queries by providing content of a captive-portal Web page. Portal server 116 can also communicate with NAP 104 to control the network connectivity provided to a particular computing device 102. For example, when a user provides valid credentials to portal server 116 via a computing device 102, portal server 116 can direct NAP 104 to provide a selected state of network connectivity, e.g., full connectivity, to the corresponding computing device 102.

In the illustrated examples, a computing device 102 can (given sufficient network connectivity) communicate via networks 110 with a responder registry 118. Responder registry 118 can store information about which responders 112 are accessible from which computing devices 102 or from which local networks 108.

Computing device 102 includes at least one processor 120 and at least one memory 122 (e.g., computer-readable medium, CRM) configured to store, e.g., data of responders 112 or probes being issued to responders 112. Memory 122 can also store a connectivity-determining component 124 stored in the memory 122 and executable on the processor 120. The component 124 can include, e.g., modules stored on computer-readable media such as computer storage media (discussed below) and having thereon computer-executable instructions. In the illustrated example environment 100, component 124 can be a component of an operating system (not shown) or otherwise stored or executed locally on computing device 102.

Memory 122 can also include information 126 of destinations or priority values 128 associated with destinations indicated in the information 126. Examples are discussed below with reference to FIG. 3. For example, the information 126 can include destination-related information as described below. Processor 120 can retrieve information (e.g., information 126 or priority values 128) from memory 122, e.g., via bus 130. Processor 120 can also communicate via bus 130 with a network interface 132, which can in turn permit communication via local network 108. In some examples, processor 120 can receive information 126 or priority values 128 via network interface 132, e.g., from a server as discussed below with reference to FIG. 3. Information 126 or priority values 128 stored by a computing device 102 may differ from Information 126 or priority values 128 stored by another computing device 102, e.g., because of differences between the computing devices 102 in the timing of receiving updated information 126 or priority values 128 from a server, or because different computing devices 102 have different operating systems or otherwise differ in ways correlated with information 126 or priority values 128.

The details of example computing device 102 can be representative of other computing devices 102 or of responders 112. However, individual ones of computing devices 102 or responders 112 can include additional or alternative hardware or software components.

Component 124 (or modules thereof, and likewise throughout the document) can be configured to determine a state of network connectivity. In some examples, component 124 can be configured to select which responders 112 to probe. In some examples, component 124 can be configured to transmit indications of destinations, e.g., names or addressed of pin-holed responders 112, to responder registry 118. In some examples, component 124 can be configured to provide, e.g., via a display device of a computing device 102, a visual representation of the state of network connectivity, e.g., as discussed below with reference to FIGS. 3 and 4. In some examples, network interface 132 is connected to at least one processor 120. A memory, e.g., memory 122, stores instructions, e.g., in component 124. The instructions, when executed by the at least one processor 120, cause the at least one processor 120 to perform operations such as the operations described below with reference to FIGS. 3-15.

In some examples, local network(s) 108 or network(s) 110 can each be or include a cable television network, radio frequency (RF), microwave, satellite, or data network, such as the Internet, and can each support wired or wireless media using any format or protocol, such as broadcast, unicast, or multicast. Additionally, each of local network(s) 108 or network(s) 110 can be any type of network, wired or wireless, using any type of network topology and any network communication protocol, and can be represented or otherwise implemented as a combination of two or more networks.

Figure 2:
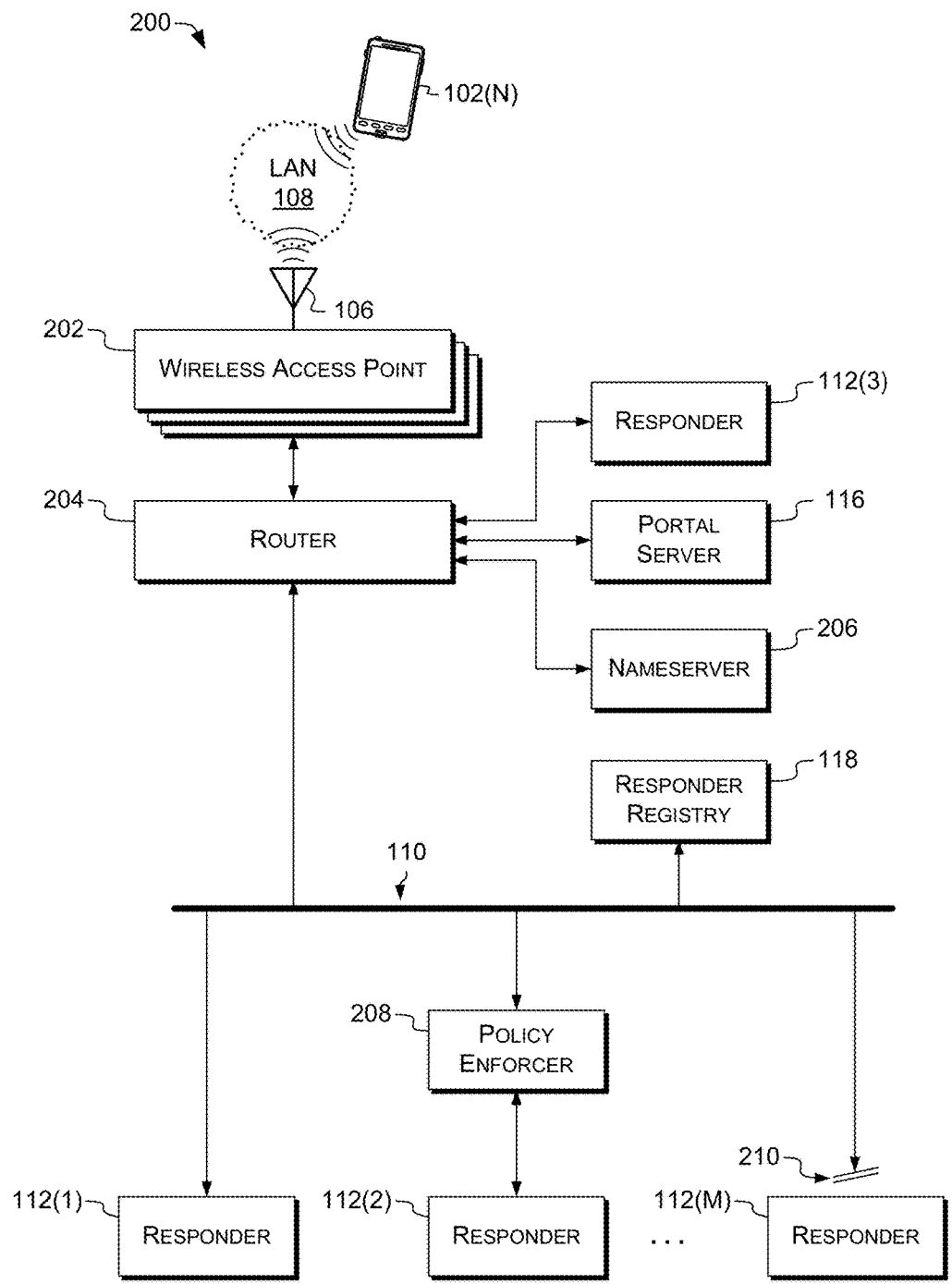
FIG. 2 is a block diagram depicting another example environment for implementing connectivity-state detection as described herein.

FIG. 2 shows an example environment 200 in which examples of network-connectivity determination can take place. The specific components shown are illustrative and not limiting. Smartphone 102(N) receives wireless service of a local network 108 from WAP 202, which can represent NAP 104, FIG. 1. WAP 202 has antenna 106. As graphically represented by the stacked boxes, a particular hotspot may have multiple WAPs 202, or a particular facility may have multiple hotspots, each with one or more WAPs 202. WAPs 202 communicate with a router 204 that directs traffic via the one or more networks 110 (graphically represented with a heavy line). Router 204 can represent a switch, router, gateway, or any other network device that selectively directs network packets (or frames, datagrams, etc.) based at least in part on the headers or contents of those packets. In some examples, router 204, WAP 202, portal server 116, or a combination of any of those, permits computing device 102(N) to access only selected whitelisted destinations. In some examples, e.g., a hotel or restaurant chain operating hotspots at multiple locations, router 204 (or multiple routers 204, e.g., one per hotspot, and likewise throughout the document) can whitelist portal server 116 from multiple hotspots. This can permit a single portal server 116 to provide captive-portal content or functions to multiple WAPs 202.

In some examples, at least one responder 112 is a nameserver mapping names of destinations, e.g., Internet hostnames, to network addresses. For example, a nameserver can include a domain name system (DNS) server responsive to name lookups to map hostnames, e.g., "www.msftncsi.com", to internet protocol (IP) addresses, e.g., 74.202.215.16 (IPv4) or 2001:4870:e009::4aca:d710 (IPv6).

In some examples, the accessible selected destinations include a nameserver 206, which can be whitelisted. For example, a captive-portal or walled-garden hotspot may permit communications with nameserver 206 even if the hotspot prohibits connections to the destinations named. Nameserver 206 can be whitelisted for name lookups, e.g., for DNS traffic on transmission control protocol (TCP) port 53 or user datagram protocol (UDP) port 53. Additionally or alternatively, nameserver 206 can be whitelisted for other traffic, e.g., pings or routing messages.

For example, a user of computing device 102(N) may desire to visit the www.microsoft.com Web site. Permitting name lookups, e.g., by whitelisting nameserver 206, can permit the user's Web browser on computing device 102(N) to successfully determine, by transmitting a name lookup request to nameserver 206 and receiving a response, that "www.microsoft.com" corresponds to network address 184.87.79.194. The Web browser can then make a request to 184.87.79.194. That request can be intercepted by router 204 and redirected to portal server 116, e.g., at private IP address 192.168.13.37. Portal server 116 can then return a captive-portal Web page instead of the desired MICROSOFT web page. In some configurations, if name lookup fails, a Web browser will not request a page. Therefore, permitting name lookups permits users to access captive-portal Web pages. Throughout the discussion of example states of network connectivity below, unless otherwise specified, router 204 can permit access to nameserver 206 for name lookups, or can permit access to nameserver 206 for any communications, or can prohibit access to nameserver 206.

In a first state of network connectivity, router 204 permits computing device 102(N) to communicate only with portal server 116. This state can represent a captive-portal situation. As noted above, router 204 can also permit computing device 102(N) to communicate with nameserver 206 for the purpose of name lookups.

In a second state of network connectivity, router 204 permits computing device 102(N) to communicate with portal server 116 or responder 112(3), but with no other destinations. This state can represent a captive-portal, walled-garden situation, in which responder 112(3) is approved by the walled garden. This state can additionally or alternatively represent a captive-portal situation in which responder 112(3) is pin-holed.

In a third state of network connectivity, router 204 permits computing device 102(N) to communicate with responder 112(1) or responder 112(3), but with no other destinations. This state can represent a walled-garden situation in which responder 112(1) and responder 112(3) are approved by the walled garden.

In a fourth state of network connectivity, router 204 permits computing device 102(N) to communicate with responders 112(1)-112(M). This state can represent an unrestricted access point. This state can additionally or alternatively represent a captive-portal situation after the user has been authorized by the portal server 116 to access destinations other than the portal server 116. This state is referred to for brevity as a "full-access state."

Even in the fourth, full-access state of network connectivity, not all responders 112 or other destinations are necessarily reachable at any given time. In the illustrated example, computing device 102 can communicate with responder 112(2) only via paths passing through policy enforcer 208. Policy enforcer 208 can include a server or other network device configured, e.g., as a selective or universal black hole, firewall, or filter. For example, policy enforcer 208 may discard packets originating from specific countries, thereby preventing computing devices 102 in those countries from accessing responder 112(2). Also in the illustrated example, the network connection to responder 112(M) is suffering a link failure 210. Link failure 210 may cause packets to responder 112(M) to be lost, preventing computing device 102(N) from accessing responder 112(M). As used herein, the state of network connectivity of a network interface does not include failures such as those due to policy enforcer 208, link failure 210, or failure of individual responders 112, e.g., due to power outages. Moreover, as used herein, the state of network connectivity may include information of level(s), set(s), or other representations of reachability of responders 112 or other destinations, or of bandwidth, latency, or other quantitative connection parameters.

As discussed below, some examples including probing multiple responders 112. In some examples, nameserver 206 can be configured to receive a request for an address of a destination, e.g., a responder 112. Nameserver 206, in response, can provide a network address, e.g., a DNS "A" (IPv4 address) record. Additionally or alternatively, nameserver 206 can respond to a request for an address with a further destination name, e.g., in a DNS "CNAME" (canonical name) record. Computing device 102 can receive the destination name and perform a further name lookup on the destination name to receive a network address (or another destination name).

In some examples, nameserver 206 can be configured to respond to a name lookup for a particular destination, such as "www.msftncsi.com", with one of a plurality of destination names, e.g., "cdn1.ncsi.example.com" and "cdn2.ncsi.example.com". Nameserver 206 can select the destination name for any particular lookup based at least in part on priority values, e.g., probabilities or ranges of a selection space, as discussed below with reference to FIG. 3. For example, nameserver 206 can respond with "cdn1.ncsi.example.com" to one third of name lookups, and with "cdn2.ncsi.example.com" to the remaining two-thirds of the name lookups. This can provide CDN 1 with roughly half the probing traffic of CDN 2. Selecting destination names based at least in part on priority values can permit adjusting the load on any particular responder 112 or CDN 114, e.g., to reduce server overload, link overload, or packet loss, and thereby to increase the accuracy of determination of the state of network connectivity.

Illustrative Processing

Figure 3:
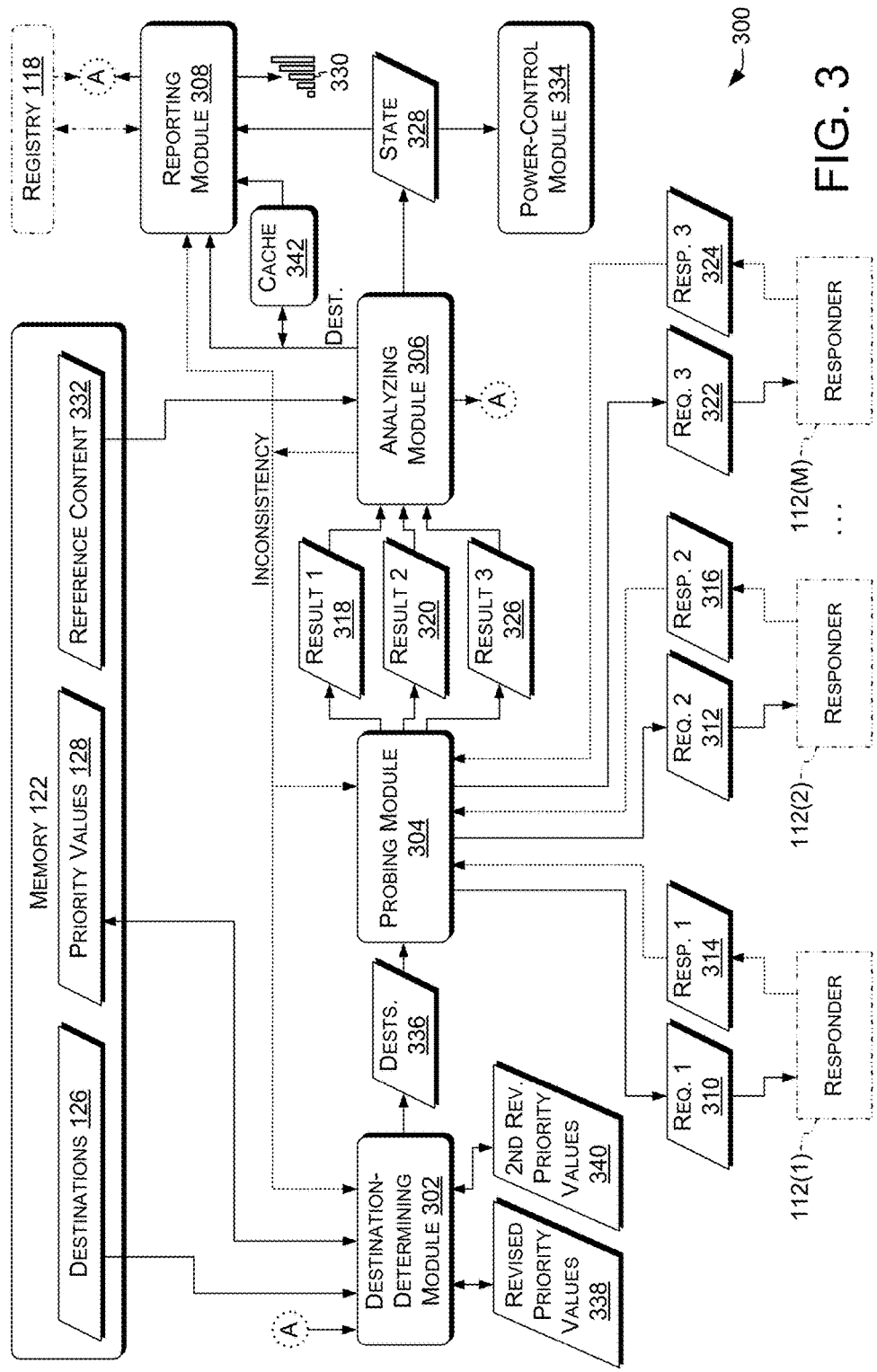
FIG. 3 is a dataflow diagram depicting example module interactions during connectivity-state detection.

FIG. 3 is a dataflow diagram 300 illustrating example interactions between components illustrated in FIG. 1, and showing example modules of connectivity-determining component 124. The modules of the connectivity-determining component 124, e.g., stored in memory 122, can include one or more modules, e.g., shell modules, or application programming interface (API) modules, which are illustrated as a destination-determining module 302, a probing module 304, an analyzing module 306, and a reporting module 308.

In some examples, probing module 304 is configured to transmit, via network interface 132, a first request 310 having a first destination. In the illustrated example, the first destination is responder 112(1) (shown in phantom). That is, the first request 310 can include information of the first destination, e.g., a hostname or network address, and the information can be associated with responder 112(1) (and likewise for other requests or destinations described herein). The first request 310 can include, e.g., one or more self-contained packets or datagrams, such as a UDP datagram. The first request can include, e.g., one or more packets to perform handshaking. Example handshaking can include a TCP three-way handshake, and the first request can include a TCP SYN packet. In some examples, the probing module 304 is configured to exchange packets with the first destination, e.g., to establish a TCP connection over which an HTTP request can be transmitted. In this and other examples, the first request can include a request in an application protocol such as HTTP or file transfer protocol (FTP).

In some examples, probing module 304 is configured to transmit, via network interface 132, a second request 312 having a second, different destination. The second request 312 can include any of the types of data or transmissions described above with reference to the first request. In the illustrated example, the second destination is responder 112(2). The first request 310 and the second request 312 can be transmitted in parallel (e.g., at least partially concurrently) or in series.

In some examples, probing module 304 is configured to receive, via the network interface 132, a first response 314 corresponding to the first request 310. Solely for clarity, arrows connected to first response 314, or to other responses described below, are shown dashed. In some examples, probing module 304 is configured to receive, via the network interface 132, a second response 316 corresponding to the second request 312. In some examples, depending on which responders 112 are up, accessible via the network, pin-holed, or blocked, probing module 304 may receive one, both, or neither of the first response 314 and the second response 316.

In some examples, probing module 304 is configured to determine a first result 318 corresponding to the first request 310. For example, probing module 304 can determine the first result 318 based at least in part on the first response 314, or based at least in part on whether a first response 314 was received. The first result 318 can indicate at least, e.g., whether the first request 310 succeeded or failed, whether the first request 310 timed out, whether or not a response was received, whether or not the first destination was reachable over the network, or specific content of the first response 314. In some examples, the first result 318 can indicate that the first request 310 successfully reached the first destination, or that no response to the first request 310 was received, or that first request 310 did not reach the first destination (e.g., due to a gateway failure). For example, the first result 318 can indicate that the first response 314 includes an error message provided by policy enforcer 208 or another computing device other than the responder 112 corresponding to the first destination.

In an example of first destination (responder 112(1)) corresponding to www.msftncsi.com, the result can indicate whether the received first response 314 contained the expected text, "Microsoft NCSI," or other text, e.g., "Welcome to Acme Hotel's Portal Page!" The former can indicate that www.msftncsi.com is reachable (whether pin-holed or not); the latter can indicate that the request was intercepted by a captive portal. The first result 318 can include text, logical values such as bits, numbers, or other representations of content or properties of first response 314.

In some examples, probing module 304 is configured to determine a second result 320 corresponding to the second request 312. Probing module 304 can determine the second result 320 based at least in part on a received second response, or based at least in part on whether a second response was received. Probing module 304 can determine the second result 320, e.g., using techniques described above for determining the first result 318. The second result 320 can contain or indicate any of the types of information described above with reference to the first result 318. Probing module 304 can provide first result 318 and second result 320 to the analyzing module 306.

In some examples, analyzing module 306 is configured to determine that the first result 318 and the second result 320 are inconsistent. In some examples, the first result 318 and the second result 320 indicate whether a successful response was received to the first request 310 or to the second request 312, respectively. In these examples, the first result 318 and the second result 320 are inconsistent if they differ, e.g., if first response 314 was received but second response 316 was not, or vice versa. In some examples, results can be inconsistent if they meet criteria for inconsistency. In some examples, results can be inconsistent if they do not meet criteria for consistency.

For example, the first result 318 and the second result 320 can be consistent (not inconsistent) if they are equal or contain equal content, if they have at least partly-overlapping content (e.g., an HTTP result code, even though HTTP header fields may differ), or if content of one is a subset of content of the other. In some examples, the first result 318 and the second result 320 can be consistent if each indicates that expected content was received in response to the respective request 310, 312.

When the first result 318 and the second result 320 are inconsistent, neither may reliably indicate the state of network connectivity. For example, responder 112(1), the first destination, may be pin-holed, while responder 112(2), the second destination, may not be pin-holed. Inconsistencies can also result from other interruptions or conditions described above, such as only one of the first destination and the second destination being approved by a walled garden. In some examples, analyzing module 306 is configured to signal the presence of the inconsistency to probing module 304, as graphically represented by the "inconsistency" connector (shown stippled solely for clarity).

In some examples, probing module 304 is configured to transmit, via the network interface, a third request 322 having a third destination, in this example responder 112(M). Probing module 304 can transmit the third request 322 in response to the indication of inconsistency from analyzing module 306, or in other situations. The third request 322 can be as described above with reference to the first request 310.

In some examples, probing module 304 is configured to receive a third response 324 corresponding to the third request 322. This can be done as described above with reference to the first response 314.

In some examples, probing module 304 is configured to determine a third result 326 corresponding to the third request 322. This can be done as described above with reference to the first result 318. For example, probing module 304 can determine the third result 326 based at least in part on the third response 324.

In some examples, analyzing module 306 is configured to determine, based at least in part on the third result 326 and at least one of the first result 318 or the second result 320, a state 328 of network connectivity of the network interface. For example, analyzing module 306 can determining that either the first result 318 or the second result 320 is consistent with the third result 326. Analyzing module 306 can then determine the state 328 of network connectivity based at least in part on the third result 326 and based at least in part on the result of the first result 318 and the second result 320 that is consistent with the third result 326. That is, analyzing module 306 can determine state 328 at least partly without regard to, or by disregarding, the one of the of the first result 318 and the second result 320 that is inconsistent with the third result 326.

In some examples, each of the first result 318, the second result 320, and the third result 326 includes or consists of a Boolean value or other logic value indicating whether or not the respective request 310, 312, 322 successfully reached the respective responder 112(1), 112(2), 112(M). Analyzing module 306, in some of these examples, determines the state 328 corresponding to the majority of the logic values. For example, if the logic values in the results 318, 320, and 326 include two True values and one False value, analyzing module 306 can determine that state 328 is a state of full connectivity (True).

In some examples, reporting module 308 is configured to provide a visual representation 330 of the determined state 328. Examples of the visual representation are described below with reference to FIG. 4.

In some examples, probing module 304 can transmit any number of requests, receive any number of responses, or determine any number of results. For example, probing module 304 can transmit M requests, one to each of M responders 112. In some examples, analyzing module 306 can analyze any number of results from probing module 304. For example, analyzing module 306 can determine state 328 as the network connectivity indicated by a simple majority or two-thirds majority of the results.

In some examples, the first destination, the second destination, and the third destination are all different. For example, the first destination, the second destination, and the third destination can be respective, different responders 112. In other examples, the third destination is either the first destination or the second destination. For example, the probing module 304 can probe responder 112(1) as the first destination, probe responder 112(2) as the second destination, and probe responder 112(1) again as the third destination. Some captive-portal systems capture only the first request 310, and then permit network access. Repeating a probe of the first destination or the second destination can permit detecting such systems without interrupting the user with a captive-portal interaction to which the user does not actually have to respond.

In some examples, the first request 310 (or second request 312 or third request 322, and likewise throughout these examples) includes a selected resource name, e.g., a URL, uniform resource identifier (URI), uniform resource name (URN), or file path (e.g., "/ncsi.txt"). The first response 314 (provided it is received) can include content, e.g., HTTP headers or a message body, file contents, or metadata. The analyzing module 306 can compare the content to reference content 332 to provide the first result 318 indicating whether the content corresponds to the reference content 332. If the content in the first response 314 corresponds to the reference content, network connectivity to the first destination is available. The reference content 332 can be stored in memory 122, e.g., computer-readable media, or in another computer-readable storage medium.

Retrieving and comparing content can permit determining network connectivity even when some network services are whitelisted. For example, as noted above with reference to nameserver 206, name lookups may be whitelisted. Therefore, results of name lookups may not reliably indicate state 328. In contrast, retrieval and comparison of content, and determination of result consistency as described above, may more reliably indicate state 328. In some examples, the first request 310 (or other request herein, as noted above) does not include a name lookup, or the first destination (or other respective destination, as noted above) is not a nameserver.

In some examples, computing device 102 includes a power-control module 334 responsive to state 328. Power-control module 334 can operate a wireless network interface at a power level corresponding to the state 328 of network connectivity of the network interface. This is described in more detail below with reference to FIGS. 4 and 6.

In some examples, one or more responders 112 can indicate, or probing module 304 can determine, that computing device 102 should not cache received responses 314, 316, or 324. For example, standard Web-browser or HTTP-proxy caching can prevent probing module 304 from receiving responses 314, 316, or 324 that accurately reflect the presence or absence of network connectivity to the respective responder 112(1), 112(2), or 112(M). In some examples, a request 310, 312, or 322 can include an HTTP request. The responder 112 can include in the respective response 314, 316, or 324 a header disabling caching. For example, the response can include the HTTP header "Cache-Control: no-cache, no-store" to direct computing device 102 not to cache the response. In some examples using a CDN 114, the responder 112 can additionally or alternatively include a header directing the CDN 114 not to cache the response. In an example using the AKAMAI CDN, the response can include the header "Edge-Control: no-cache, no-store" to direct the CDN 114 not to cache the response. In some examples, probing module 304 can disable caching of received responses.

In some examples, destination-determination module 302 is configured to determine one or more destinations and to provide indications 336 ("Dests.") of the destinations to the probing module 304. The probing module can select or extract at least information, e.g., identification, of the first destination, second destination, or third destination from the indications 336.

In some examples, destination-determination module 302 is configured to select a first destination indication of a plurality of destination indications. For example, the plurality of destination indications can be stored in a table or other information 126 of destinations. The first destination indication can be, e.g., a row in a table of information 126. Selecting the first destination indication from the plurality of destination indications can permit, e.g., using multiple CDNs 114 to respond to probes, which can reduce the network load on any one responder 112 or CDN 114. For example, the plurality of destination indications can include URLs indicating multiple, different hostnames. In an example, the destination indications can include "http://cdn1.ncsi.example.com" resolving to IP address(es) served by a first CDN 114 and "http://cdn2.ncsi.example.com" resolving to IP address(es) served by a second CDN 114. Selecting from among multiple destination indications can also permit determining state 328 even in the presence of failures of a particular destination associated with a particular one of the destination indications.

In some examples, at least some destination indications of the plurality of destination indications listed in information 126 correspond to respective priority values 128 and the selecting is based at least in part on at least one of the priority values 128. For example, the priority values can correspond to probabilities, or ranges of a selection space, as discussed below. In some examples, the destination-determination module 302 is configured to receive, via the network interface, respective ones of the priority values 128 of the at least some destination indications in the information 126. Selecting destination indications based at least in part on priority values 128 can permit, e.g., adjusting the proportion of probes handled by various of the destinations (e.g., responders 112). For example, as noted above, an OS vendor may wish to operate multiple responders 112, or contract with multiple CDNs 114, to handle probing traffic. Different responders 112, whether standalone or in a CDN 114, may have different capabilities to handle network traffic. Selecting based in priority values 128 can permit providing each responder 112 with an aggregate load that responder 112 is equipped to handle. This can reduce the probability of packet loss due to overloaded responders 112 or network links, which can in turn permit more accurately determining the state 328 of network connectivity.

In some examples, the priority values indicate respective ranks of the destination indications. For example, each destination indication can have a unique rank. The destination-determination module 302 can select, as the first destination indication, the destination indication having the highest rank.

In some examples, the priority values indicate a probability of selection. The priority values of the destinations indicated in information 126 can sum to unity (or can be normalized to unity, and likewise throughout the document). The destination-determination module 302 can, for each destination indication in turn, take a draw from a uniform (or substantially uniform, and likewise throughout the document) distribution between 0 and 1 (an open, closed, or semi-open interval, and likewise throughout the document). For example, the destination-determination module 302 determine a uniformly-distributed random (or pseudorandom, and likewise throughout the document) number between 0 and 1 for each destination indication in turn. The destination-determination module 302 can select, as the first destination indication, the earliest-tested destination indication for which the random number is less than the probability of selection. In this way, destinations with higher probabilities are more likely to be selected than are destinations with lower probabilities.

In some examples, distributions other than uniform can be used, and priority values other than probabilities can be used. For example, for a particular destination indication, a draw can be taken from a normal distribution, and the priority value can indicate the minimum number of standard deviations away from the mean that will result in that destination indication being selected as the first network destination.

In some examples, the priority values indicate a proportion of a selection space occupied by the respective destination indication. For example, the priority values can sum to unity, as discussed above. The destination indications can be allotted ranges in a selection space based their probabilities. A single draw can be taken from a uniform distribution over the selection space, e.g., between 0 and 1. The destination-determination module 302 can select, as the first destination indication, the destination indication into the range of which the number falls. An example is given below in Table 1.

TABLE 1

| Destination Indication | Probability | Range |
| --- | --- | --- |
| A | 0.13 | [0, 0.13) |
| B | 0.37 | [0.13, 0.5) |
| C | 0.42 | [0.5, 0.92) |
| D | 0.08 | [0.92, 1) |

A draw from a uniform distribution on [0,1) will fall into exactly one of the four ranges. For example, 0.5<0.64<0.92, so a draw of 0.64 is in the range of destination indication C shown in Table 1. Therefore, for a draw of 0.64, the destination-determination module 302 would select destination indication C as the first destination indication.

In some examples, the priority values indicate occupancy of a selection space by amount rather than proportion. For example, a selection space with 200 elements and priority values of 26, 74, 84, and 16, for destination indications A-D respectively, with selection performed by a uniform draw over [0, 200), would provide the same selection probabilities as the example of Table 1.

In some examples, destination-determination module 302 is configured to determine a first group of destination indications of the plurality of destination indications listed in information 126. The first group in some examples omits the first destination indication. For example, the first group can include each of the plurality of destination indications except for the first destination indication. In other examples, the first group can include each of the plurality of destination indications except for destination indication(s) corresponding to a same destination as the first destination indication. In other examples, the first group can be selected randomly from among the plurality of destination indications, and the first destination indication can be removed from the group if the destination indication is selected.

In some examples, destination-determination module 302 is configured to determine respective revised priority values 338 of at least one of the destination indications of the first group of destination indications based at least in part on at least one of the priority values 128. The priority value(s) 128 used in selecting the first destination indication can also be used in determining the revised priority values 338, or others of the priority values 128 can be used.

In some examples, the destination-determination module 302 is configured to determine the respective revised priority values 338 by normalizing the respective priority values 128 of the destination indications of the first group based at least in part on a sum of the respective priority values 128 of the destination indications of the first group. Continuing the example of Table 1, once destination indication C is selected, the remaining destinations have priority values summing to 0.58. Each priority value can be divided by 0.58 to normalize the sum of the revised priority values 338 to unity, resulting in the values in Table 2.

TABLE 2

| Destination Indication | Probability | Revised Probability | Revised Range |
| --- | --- | --- | --- |
| A | 0.13 | 0.22 | [0, 0.22) |
| B | 0.37 | 0.64 | [0.22, 0.86) |
| C (omitted from first group) | 0 | 0 | N/A |
| D | 0.08 | 0.14 | [0.86, 1) |

In some examples, the destination-determination module 302 is configured to determine the revised priority values 338 as copies of the respective priority values 128. For example, given priority values indicating occupancy of a selection space by amount, the revised priority values 338 can be equal to the priority values 128.

In some examples, destination-determination module 302 is configured to select a second destination indication from the first group of destination indications based at least in part on the revised priority values 338. This can be done, e.g., as discussed above with reference to selecting the first destination indication. Selecting the second destination indication from the first group of destination indications can permit detecting or mitigating pin-holing, since even if the first destination indication corresponds to a pin-holed responder 112, the second destination may correspond to a responder 112 that is not pin-holed.

In some examples in which the revised priority values 338 are copies of the respective priority values 128, the destination-determination module 302 can select the second destination indication by adjusting the selection space to fit the revised priority values 338. Continuing the example above, when destination indication C is selected, the revised priority values 338 for destination indications A, B, and D can continue to be equal to the respective priority values 128 for destination indications A, B, and D, e.g., 26, 74, and 16. These values sum to 116. The destination-determination module 302 can adjust the selection space to [0, 116), and take a draw from a uniform distribution on [0,116) to determine the second destination indication.

In some examples, probing module 304 is configured to query a first destination corresponding to the first destination indication to provide first a query result. The querying can be performed via a network interface communicatively connected with a processor, as described above. For example, probing module 304 can, as part of the query, transmit the first request 310 and determine the first result 318, as described above. The first query result can be or include the first result 318. In some examples, probing module 304 can receive the first response 314 and determine the first result 318 based at least in part on the first response 314, also as described above.

In some examples, analyzing module 306 is configured to determine a state of network connectivity of the network interface based at least in part on the first query result. This can be done as discussed above.

In some examples, probing module 304 is configured to query a second destination corresponding to the second destination indication to provide a second query result. This can be done, e.g., as discussed above with reference to at least the second request 312, second response 316, or second result 320.

In some examples, analyzing module 306 is configured to determine the state of network connectivity of the network interface further based at least in part on the second query result. In some examples, analyzing module 306 is configured to determine that the first query result and the second query result are inconsistent. Analyzing module 306 can provide an indication of the inconsistency to destination-determination module 302, as depicted.

In some examples, destination-determination module 302 is configured to, e.g., in response to the first query result and the second query result being inconsistent, determine a second group of destination indications of the first group of destination indications. The second group can omit the second destination indication. In some examples, the second group omits both the first destination indication and the second destination indication. The second group can be selected, e.g., as described above with reference to the first group.

In some examples, destination-determination module 302 is configured to determine respective second revised priority values 340 of at least one of the destination indications of the second group of destination indications based at least in part on at least one of the priority values 128 or at least one of the revised priority values 338. This can be done, e.g., as discussed above with reference to determination of the revised priority values 338. The at least one of the priority values 128 or at least one of the revised priority values 338 can be used in selecting destinations, or others of the at least one of the priority values 128 or at least one of the revised priority values 338 can be used.

In some examples, destination-determination module 302 is configured to select a third destination indication from the second group of destination indications based at least in part on the second revised priority values 340. This can be done, e.g., as discussed above with reference to selection of the second destination.

In some examples, probing module 304 is configured to query a third destination corresponding to the third destination indication to provide a third query result. This can be done, e.g., as discussed above with reference to the third request 322, third response 324, or third result 326.

In some examples, analyzing module 306 is configured to determine the state 328 of network connectivity of the network interface further based at least in part on the third query result. This can be done, e.g., as discussed above with reference to the third result 326.

In some examples, the information 126 of the destinations can include multiple, different names for a particular responder 112, or can include multiple entries corresponding to a same one of the responders 112. For example, three destination indications in the information 126 can correspond to three different names for a single responder 112. In some examples, the first destination indication corresponds to a first network address and the second destination indication corresponds to the first network address. In some examples, the first destination indication corresponds to a second network address and the third destination indication corresponds to the second network address. In some examples, the second destination indication corresponds to a third network address and the third destination indication corresponds to the third network address. In some examples, any of the first, second, or third destinations corresponds to a same responder 112 (e.g., to a same network address) as at least one other of the first, second, or third destinations. In some examples, the first, second, and third destinations correspond to a single responder 112.

In some examples, reporting module 308 is configured to provide an indication of at least one of the destinations. For example, reporting module 308 can determine that a particular destination is not a reliable indicator of state 328, and report that information to a server for the benefit of other computing devices 102.

In some examples, probing module 304 is configured to query a first destination (e.g., responder 112(1)) to provide a first result 318. This can be done, e.g., as discussed above with reference to the first request 310. In some examples, probing module 304 is configured to query a second destination (e.g., responder 112(2)) to provide a second result 320. This can be done, e.g., as discussed above with reference to the second request 312. In some examples, probing module 304 is configured to query a third destination (e.g., responder 112(M)) to provide a third result 326. This can be done, e.g., as discussed above with reference to the third request 322.

In some examples, analyzing module 306 is configured to determine the state 328 of network connectivity, e.g., of processor 120, based at least in part on at least the first result 318, the second result 320, or the third result 326. This can be done as discussed above. For example, the analyzing module 306 can determine that the first result 318 and the second 320 are inconsistent. The analyzing module 306 can then determine that the third result 326 is consistent with either the first result 318 or the second result 320, and determine the state 328 of network connectivity based on the third result 326. Determining the state 328 of network connectivity based at least in part on the third result 326 known to be consistent with at least one other result 318 or 320 can improve the accuracy of detection of the state 328, e.g., in a pin-holed configuration.

In some examples, analyzing module 306 is configured to determine, based at least in part on at least the first result 318, second result 320, or third result 326, that a selected destination of the first, second, and third destinations does not correspond to the state 328 of network connectivity. For clarity and without limitation, the selected destination is referred to herein as an "uninformative destination." For example, if the first result 318 and the second result 320 are inconsistent, and the first result 318 and the third result 326 are consistent, the analyzing module 306 can determine that the second result 320 does not correspond to the state 328 of network connectivity. The analyzing module 306 can, in response, determine that the second destination does not correspond to the state 328 of network connectivity, i.e., that the second result does not correspond to the state 328 of network connectivity, and thus that the second destination is an uninformative destination. The analyzing module 306 can provide an indication of the uninformative destination ("Dest.") to the reporting module 308.

In some examples, the analyzing module 306 can further determine that the second destination does not correspond to the state 328 of network connectivity based at least in part on specifics of the first result 318, second result 320, or third result 326. For example, if the first result 318 and the third result 326 indicate that the state 328 is a full-access state, and the second result 320 indicates that the second request 312 timed out, the analyzing module 306 can determine that the second destination does not correspond to the state 328 of network connectivity. Alternatively, the analyzing module 306 can determine that the timeout may be due to a link failure such as link failure 210, FIG. 2, and thus that it is not possible to determine whether the second destination corresponds to the state 328 of network connectivity.

In some examples, reporting module 308 is configured to transmit an indication of the uninformative destination via a network, e.g., network 110, FIG. 1 or at least one different network. For example, reporting module 308 can transmit the indication to responder registry 118 (shown in phantom). Responder registry 118 can be operated, e.g., by a vendor of reporting module 308, e.g., an operating-system (OS) vendor. Responder registry 118, the recipient of the indication, can propagate information of the uninformative destination, permitting other computing devices 102 to avoid querying or probing the uninformative destination. Avoiding querying or probing uninformative destination(s) can reduce bandwidth usage and elapsed time required to determine state 328.

In some examples, analyzing module 306 is configured to determine that the state 328 of network connectivity indicates one or more characteristics of network connectivity outside selected parameters. In these examples, the indication of the uninformative destination can be stored for later transmission, as described below. For example, the state 328 may indicate that the computing device 102 is offline, that insufficient bandwidth is available to transmit the indication, that network latency is too high to attempt a transmission, or that the network connectivity is not sufficient for the transmission. In various examples storing data for later transmission, below-described functions of the analyzing module 306 can additionally or alternatively be performed by reporting module 308 or by analyzing module 306 operating in conjunction with reporting module 308. Further examples of testing state 328 against selected parameters are described below with reference to blocks 612-616, FIG. 6.

In some examples, analyzing module 306 is configured to store information of the uninformative destination in a computer storage medium to provide stored information. The computer storage medium holding the stored information is graphically depicted as, and referred to herein for brevity as, cache 342. Analyzing module 306 can store the information in cache 342, e.g., in response to the determination that the state 328 of network connectivity indicates one or more characteristics of network connectivity outside selected parameters as noted above.

In some examples, analyzing module 306 is configured to determine the indication of the uninformative destination based at least in part on the stored information. For example, analyzing module 306 can retrieve the stored information, including the indication, from cache 342. The analyzing module 306 can then provide the indication to reporting module 308 for transmission. The indication can be transmitted, e.g., in response to a change in state 328 of network connectivity so that the state 328 of network connectivity indicates that the one or more characteristics of network connectivity meet (or are within, conform to, or satisfy) selected parameters. For example, the reporting module 308 can transmit the indication in response to the user's being authorized by a captive portal, or when computing device 102 connects to a different supplier of network service that provides full-access connectivity.

In some examples, at least one of the modules 302-308, e.g., reporting module 308, is configured to determine local-network-specific information ("LNSI"). For example, the reporting module 308 can operate the network interface 132 to determine a network characteristic, and then determine the LNSI based at least in part on the network characteristic. For example, the reporting module 308 can operate the network interface 132 to at least transmit data, receive data, sniff data, measure times between packets or frames, measure bandwidth used, test bandwidth available (e.g., by communication with a test server such as those operated in connection with SPEEDTEST.NET), or report link characteristics such as link speed (e.g., 10 Mbps vs. 100 Mbps Ethernet). The reporting module 308 can determine the network characteristic including, or based at least in part on, data provided by any, or any combination, of the listed operations. For example, the LNSI can include a wireless network identifier such as a Service Set Identifier (SSID) of the network. At least one of the modules 302-308, e.g., reporting module 308, can be configured to receive the wireless network identifier via a wireless network interface.

In some examples, for a WIFI network, the LNSI can include or indicate the SSID of the network. In other examples, for an Ethernet network, the LNSI can include the Ethernet media access control (MAC) address of, e.g., a default gateway (GW) or dynamic host configuration protocol (DHCP) server on that network. In some examples, the LNSI can include an IP or other network address of a default GW, WAP, NAP 104, DHCP server, or other configuration server. In some examples, the LNSI can indicate reachability of a particular nameserver 206 or link characteristics.

In some examples, reporting module 308 is configured to transmit the LNSI in association with the indication of the uninformative destination. Reporting module 308 can transmit the LNSI, e.g., to responder registry 118. Collecting and transmitting LNSI can permit computing devices 102 having information of the LNSI to more effectively select destinations based on local characteristics, e.g., to avoid destinations that are uninformative from a particular local network 108. Further examples are described below, e.g., with reference to FIG. 7 or 15.

In some examples, analyzing module 306 is configured to determine information of an inconsistency between the state 328 of network connectivity and at least the first result 318, the second result 320, or the third result 326. This can be done as discussed above.

In some examples, reporting module 308 is configured to transmit, e.g., to responder registry 118, the information of the inconsistency in association with the indication of the uninformative destination. This can permit reporting module 308 to report nature of the problem with an uninformative destination. For examples, the information of the inconsistency can indicate that the uninformative destination was pin-holed, unreachable, or experiencing a server failure (e.g., server misconfiguration). The information of the inconsistency can permit the recipient, e.g., responder registry 118, to propagate information of the uninformative destination in response to a likelihood that the uninformative destination will continue to be uninformative. For example, a pin-holed destination is likely to remain pin-holed, but a server experiencing a server failure may be repaired and cease to be an uninformative destination.

In some examples, analyzing module 306 is configured to determine, based at least in part on at least the first, second, or third results, a first group of nonresponsive destinations of the first, second, and third destinations. The first group can include one or more nonresponsive destinations. Nonresponsive destinations can include, e.g., destinations from which no response was received to a request sent by probing module 304. A destination may be nonresponsive due to failure at the destination or due to communication interruptions such as those introduced by policy enforcer 208 or link failure 210 (both FIG. 2).

In some examples, reporting module 308 is configured to transmit an indication of the first group via the network, e.g., to responder registry 118. The indication of the first group can include, e.g., data identifying at least one of the nonresponsive destinations in the first group.

In some examples, reporting module 308 is configured to transmit, e.g., to responder registry 118, an indication of at least one of the destinations and one or more reachability states of respective destinations. For example, reporting module 308 can transmit an indication, for each destination, of whether or not that destination was reachable. In some examples, reporting module 308 can transmit indications of only unreachable or nonresponsive destinations, or can transmit indications of only reachable or responsive destinations.

In some examples, analyzing module 306 or reporting module 308 can be configured to store information of the first group, reachability indications, or other information described above. The information can be stored in cache 342. For example, information can be stored in response to a determination that the state 328 of network connectivity indicates one or more characteristics of network connectivity outside selected parameters, as discussed above. In response to state 328 indicating the characteristics are within the selected parameters, e.g., at a time later than the time of storing the information, reporting module 308 can transmit at least some of the stored data, e.g., to responder registry 118.

In some examples, responder registry 118 can collect, filter, sort, or otherwise analyze received information, or distribute the received information or reports or analyses thereof, to computing device(s) 102. The information can include, e.g., at least identification information or other indications of an uninformative destination; information of the nature of an inconsistency between the state 328 and a result corresponding to the uninformative destination; LNSI; information of a group of nonresponsive destinations or individual nonresponsive destination(s); or stored data of any of the listed items. In some examples, computing device 102 can receive information 126 of the destinations from responder registry 118. In some examples, responder registry 118 can provide information 126 omitting indications of responders that are uninformative or nonresponsive.

In some examples, destination-determining module 302 can be configured to receive destination-related information, e.g., from responder registry 118. The destination-related information can be included in or with information 126. The destination-related information can include at least any of the types described above, e.g., LNSI, uninformative- or nonresponsive-destination identifiers, destination indication(s), priority values 128, or reference content 332. In some examples, destination-determining module 302 can be configured to determine second LNSI, e.g., using a network characteristic or otherwise as described above with reference to determining LNSI.

In some examples, destination-determining module 302 can be configured to select or otherwise determine at least the first destination, the second destination, or the third destination based at least in part on the received destination-related information. In some examples, the destination-determining module 302 can omit at least one uninformative or nonresponsive destination indicated in the destination-related information from consideration as a destination to be probed or queried. In some examples, the destination-determining module 302 can select or otherwise determine, as at least the first destination, the second destination, or the third destination, a destination not indicated in the destination-related information. Omitting uninformative or nonresponsive destinations can increase the likelihood of receiving meaningful responses from the queried destinations, decreasing the number of bits that need to be transmitted to determine state 328 and thus saving bandwidth and power (e.g., battery power).

In some examples, destination-determining module 302 can be configured to determine at least some of the received destination-related information corresponding to the determined second LNSI. For example, destination-determining module 302 can determine that particular LNSI in the destination-related information corresponds to the determined second LNSI. For example, the particular LNSI can correspond to the determined second LNSI if the particular LNSI and the determined second LNSI are wholly, or at least in values of selected fields, equal or overlapping, or if one is, wholly or at least in values of selected fields, included in or otherwise a subset of the other.

In response to a correspondence between the particular LNSI and the determined second LNSI, destination-determining module 302 can then, e.g., omit uninformative or nonresponsive destinations from the at least some of the received destination-related information. For example, destination-determining module 302 can select at least the first destination, the second destination, or the third destination to be different from a destination associated with the particular LNSI.

For example, a first WIFI network, having SSID "Alice", may pin-hole a particular destination, e.g., www.msftncsi.com. A second WIFI network, having SSID "Bob", may not pin-hole www.msftncsi.com. Destination-determining module 302 can receive destination-related information indicating that www.msftncsi.com is an uninformative destination correlated with LNSI indicating an SSID of "Alice". Destination-determining module 302 can determine the second LNSI including the SSID of a WIFI network from which computing device 102 is receiving network service, e.g., "Alice" or "Bob". Destination-determining module 302 can then omit www.msftncsi.com when connected to network "Alice" but not omit www.msftncsi.com (e.g., select www.msftncsi.com as a destination) when connected to network "Bob" or to another network, e.g., having SSID "Charlie".

In some examples, destination-determining module 302 can select at least the first destination, the second destination, or the third destination to be a destination associated with the particular LNSI. For example, an operator of WIFI hotspots with particular SSID(s), e.g., "demoscene1" and "demoscene2", may have a network known to be configured so that "ncsi.demoscene.example.com" is a reliable indicator of the state of network connectivity. In this example, destination-determining module 302 can select "ncsi.demoscene.example.com" as at least one of the first destination, the second destination, or the third destination.

In some examples, information 126, e.g., received by computing device 102 from responder registry 118, can indicate that a particular destination should be the primary or only destination used for a network with associated LNSI. In some of these examples, probing module 304 can probe only the particular destination, or can probe the particular destination with the first request 310. This can reduce probing network load when using network service with known characteristics. Probing of particular destinations is discussed below at least with reference to FIG. 15.

In some examples, destination-determination module 302 is configured to select, as the first destination indication or another destination indication described herein, a predetermined destination indication. Reporting module 308 can then provide to responder registry 118 information about probes corresponding to the predetermined destination indication. For example, on a MICROSOFT computing device 102, destination-determination module 302 can select <URL:http://www.msftncsi.com/ncsi.txt> as at least one of the destination indications. Using at least one predetermined destination common between many or all probes carried out, e.g., by devices from a particular OS vendor, can permit comparing the network connectivity levels provided by different network access devices. Performing such comparing can permit the entity operating responder registry 118 to adjust operation of its network, or recommend adjustments in the operations of other networks, to reduce probing load while still permitting effective determination of state 328. Performing such comparing can additionally or alternatively permit the entity operating responder registry 118 to adjust the destinations selected by or available to computing devices 102 to permit effectively determining state 328, e.g., as described herein with reference to LNSI.

Compared to some prior schemes, selecting destinations using destination-related information and second LNSI can permit computing device 102 to determine state 328 using a lower amount of network data or to determine state 328 with reduced usage of energy or reduced peak power draw. Compared to some prior schemes, selecting destinations using destination-related information and second LNSI can permit computing device 102 to determine state 328 while not needlessly constraining the destinations available to computing device 102. Leaving more destinations available to computing device 102 can permit computing device 102 to more quickly determine state 328, e.g., by setting timeouts on responses and querying an additional destination if a response to a request is not received within the timeout.

In some examples, analyzing module 306 or reporting module 308 can be configured to provide destination-related information to destination-determining module 302 without passing through responder registry 118. For example, analyzing module 306 can store destination-related information in cache 342, and reporting module 308 can provide the destination-related information from cache 342 to destination-determining module 302. In some examples, destination-determining module 302 can retrieve destination-related information directly from cache 342 or receive destination-related information directly from analyzing module 306.

Illustrative Components

Figure 4:
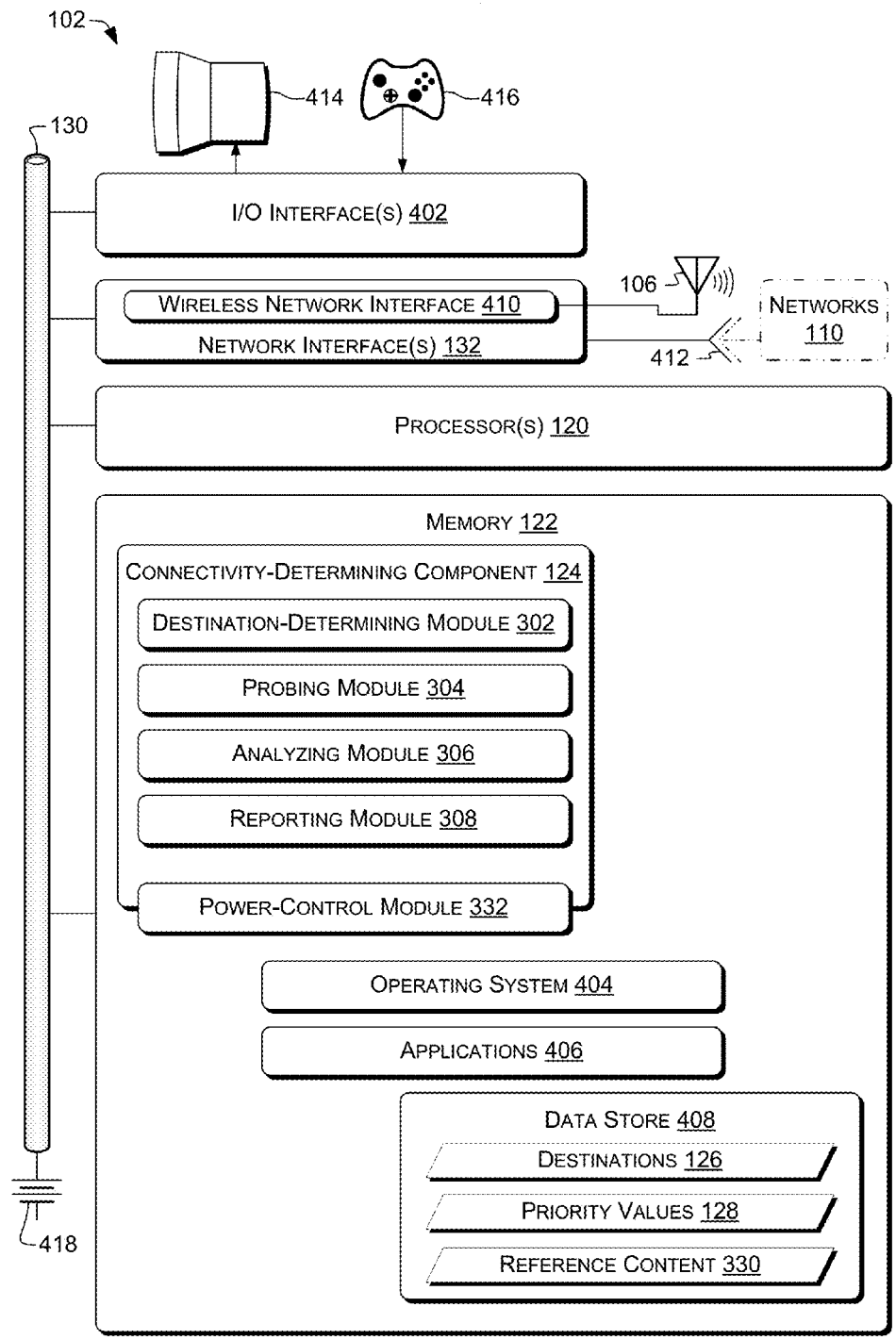
FIG. 4 is a block diagram depicting an example computing device configured to participate in connectivity-state detection or to respond to detected connectivity states according to various examples described herein.

FIG. 4 illustrates select components of an example computing device 102. In the illustrated example, computing device 102 includes one or more processor(s) 120, a memory 122, input/output (I/O) interfaces 402, or network interface(s) 132. Memory 122 can be implemented as any combination of various types of memory components, e.g., computer-readable media (CRM) or computer storage media components. Examples of possible memory components include a random access memory (RAM), a disk drive, a mass storage component, and a non-volatile memory (e.g., ROM, Flash, EPROM, EEPROM, etc.). Alternative implementations of computing device 102 can include a range of processing and memory capabilities. For example, full-resource computing devices can be implemented with substantial memory and processing resources, including a disk drive to store content for replay by the viewer. Low-resource computing devices, however, can have limited processing and memory capabilities, such as a limited amount of RAM, no disk drive, and limited processing capabilities.

Processor(s) 120 process various instructions to control the operation of computing device 102 and to communicate with other electronic and computing devices. For example, the processor(s) 120 can be configured to execute modules of a plurality of modules, discussed above with reference to FIG. 3, on the memory 122. In some examples, the computer-executable instructions stored on the memory 122 can, upon execution, configure a computer such as a computing device 102 to perform operations described herein with reference to, e.g., connectivity-determining component 124 or modules thereof. The modules stored in the memory 122 can include instructions that, when executed by the one or more processor(s) 120, cause the one or more processor(s) 120 to perform operations described herein.

The memory 122 stores various information or data, including, for example, at least a connectivity-determining component 124, an operating system 404, or one or more other applications 406. Functionality described associated with the illustrated components or modules can be combined to be performed by a fewer number of components or modules or can be split and performed by a larger number of components or modules. The other applications 406 can include, for example, an Internet browser such as a Web browser, a captive-portal browser, a media player application, a video editing application, a video streaming application, a television viewing application, and so on. In some examples, computer-executable instructions of connectivity-determining component 124 or applications 406 stored in at least one computer-readable medium (e.g., memory 122), when executed on processor 120 of computing device 102, direct computing device 102 to perform functions listed herein with respect to the relevant components in memory 122.

In some examples, connectivity-determining component 124 determines a state of network connectivity of computing device 102. This can be as described above with reference to FIG. 3, e.g., using algorithms such as those described above. In some examples, connectivity-determining component includes power-control module 334, FIG. 3. In some examples, power-control module 334 can be, or be included in, a different component (omitted for brevity). Functions of power-control module 334 are described in more detail with reference to FIG. 6.

In the illustrated example, memory 122 includes a data store 408. In some examples, data store 408 can store information described above with reference to FIG. 3, e.g., information 126 of destinations, priority values 128 of destinations, or reference content 332. In some examples, data store 408 can store information described above with reference to cache 342.

Network interface(s) 132 can permit computing device 102 to communicate with other computing devices 102. For example, network interface(s) 132 can establish or facilitate receiving wired or wireless network service. In some examples, at least one of the network interface(s) 132 can include, but is not limited to, a transceiver for Ethernet, cellular (3G, 4G, or other), WI-FI, ultra-wideband (UWB), BLUETOOTH, satellite, or other wireless transmissions. At least one of the network interface(s) 132 can include a wired I/O interface, such as an Ethernet interface, a serial interface, a Universal Serial Bus (USB) interface, an INFINIBAND interface, or other wired interfaces. In some examples, at least one of the network interface(s) 132 can communicate wirelessly with at least one of the network(s) 110 via antenna 106. In some of these examples, the at least one of the network interface(s) 132 is or includes a wireless network interface 410. In some examples, the computing device 102 can include a cable jack 412, e.g., a plug, socket, or receptacle, communicatively connected to at least one of the network interface(s) 132. The at least one of the network interface(s) 132 can communicate with at least one of the network(s) 110 via cable jack 412. Cable jack 412 can include, e.g., an RJ-45 Ethernet receptacle.

I/O interface(s) 402 can additionally or alternatively include, or be communicatively connected with, for example, a display device 414, enabling computing device 102 to present video content. In example implementations, I/O interface 402 provides signals to a touchscreen or other display device that displays, e.g., Web pages of captive portals. In some examples, computing device 102 can be configured to present, on display device 414, a visual representation of the state 328 of network connectivity of at least one of the network interface(s) 132. The visual representation can include, e.g., a red/green (or red/blue) stoplight indicator, a "bars" indicator showing connecting strength as a bar graph, a network icon showing an "X" or "!" for no or reduced connectivity, respectively, a depiction of a hedge for walled-garden configurations, or a depiction of a gate for captive-portal configurations. Presenting a visual representation distinguishing no-connectivity, walled-garden, and captive-portal configurations can reduce the amount of time required for a user to determine an appropriate action to improve network connectivity of the computing device 102. For example, even if the user is not using a Web browser, a depiction of a gate can indicate to the user that opening a Web browser to interact with a captive portal should readily correct network-connectivity failures.

I/O interface(s) 402 can additionally or alternatively include, or be communicatively connected with, for example, a user-operable input device 416 (graphically represented as a gamepad), enabling a user to, e.g., direct computing device 102 to establish connections to specific destinations. User-operable input device 416 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT.

Although shown separately, some of the components of computing device 102 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 120 can represent a hybrid device, such as a device from ALTERA or XILINX that includes a CPU core embedded in an FPGA fabric. These or other hardware logic components can operate independently or, in some instances, can be driven by a CPU. In some examples, processor 120 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

Additionally, a system bus 130 typically connects the various components within computing device 102. A system bus 130 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus.

In some examples, computing device 102 is powered by a battery 418 or other power supply providing only limited energy or power. For example, computing device 102 can be or include a smartphone or other portable computing device, as noted above, or a battery-powered WAP 202 that provides network connectivity to other computing devices based on the network connectivity provided to the WAP 202. Examples are discussed below with reference to FIG. 6.

Any of the components illustrated in FIG. 4 can be in hardware, software, or a combination of hardware and software. Further, any of the components illustrated in FIG. 4, e.g., memory 122, can be implemented using any form of computer-readable media that is accessible by computing device 102, either locally or remotely, including over a network 110. Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including, but not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 102.

In contrast to computer storage media, communication media can embody computer-readable instructions, data structures, program modules, or other data in a modulated data signal, such as a carrier wave, or other transmission mechanism. As defined herein, computer storage media does not include communication media. In some examples, memory 122 can be or include computer storage media.

Illustrative Processes

FIGS. 5-15 illustrate example processes for determining a state of network connectivity or responding to the determined state. The methods are illustrated as sets of operations shown as discrete blocks. The methods can be implemented in any suitable hardware, software, firmware, or combination thereof. For example, functions shown in FIGS. 5-15 can be implemented on or otherwise embodied in one or more computing devices 102, e.g., using software running on such devices. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

The order in which the operations are described is not to be construed as a limitation, and any number of the described operations can be combined in any order or in parallel to implement each process. For clarity of explanation, reference is made to various components and data items shown in FIGS. 1-4 that can carry out or participate in the steps of the exemplary methods. It should be noted, however, that other components can be used; that is, exemplary methods shown in FIGS. 5-15 are not limited to being carried out by the identified components.

Figure 5:
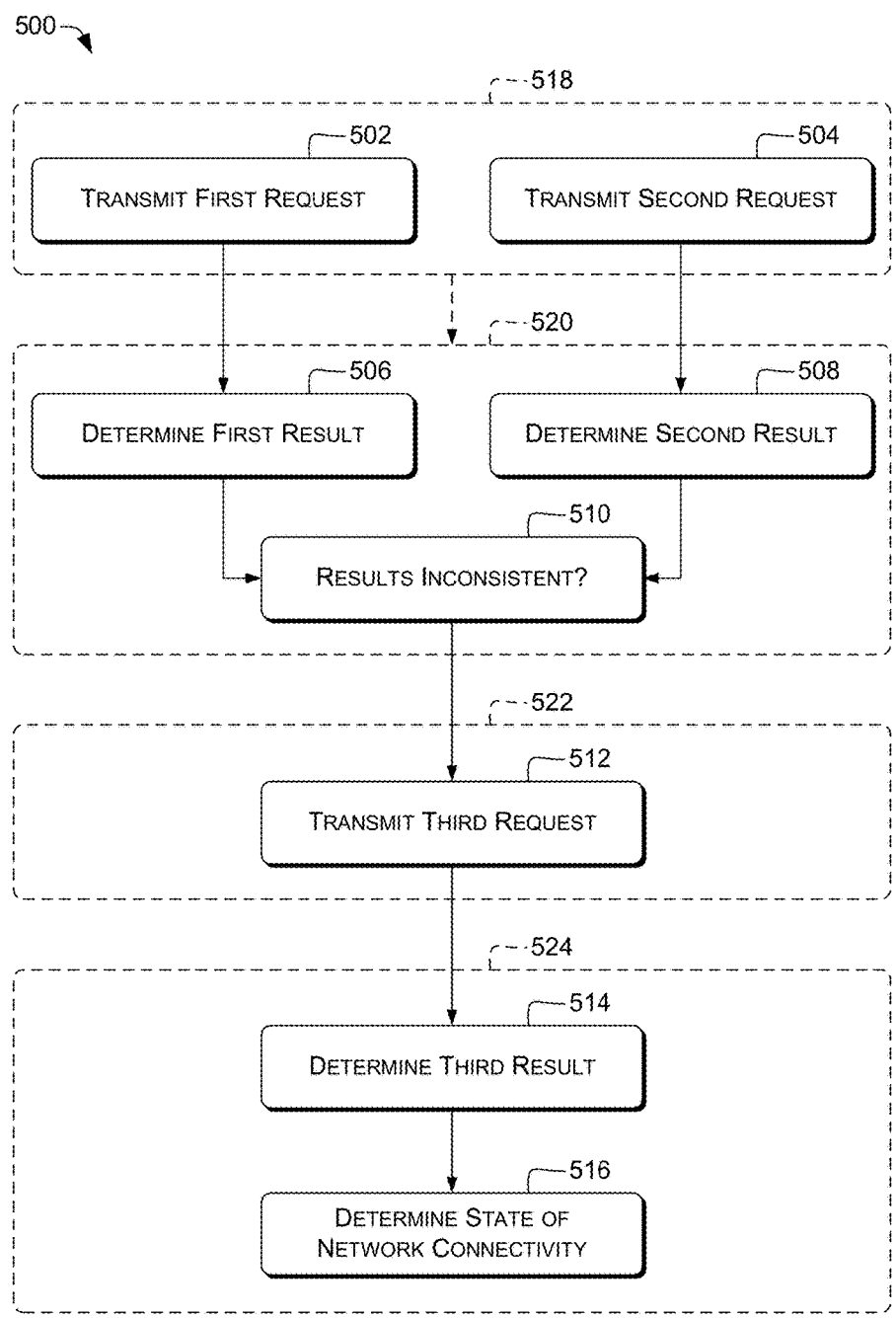
FIG. 5 is a flow diagram that illustrates an example process for determining a state of network connectivity of a network interface.

FIG. 5 illustrates an example process 500 for determining a state of network connectivity of a network interface.

At block 502 a first request 310 is transmitted via the network interface. The first request 310 has a first destination. This can be done as discussed above with reference to FIG. 3. In some examples, the first request 310 comprises a selected resource name, e.g., a URL of a Web page having known content. Content is described below with reference to blocks 602 and 604.

At block 504 a second request 312 is transmitted via the network interface. The second request 312 has a second, different destination. This can be done as discussed above with reference to FIG. 3.

At block 506, a first result 318 corresponding to the first request is determined. This can be done as discussed above with reference to FIG. 3. For example, the first result 318 can indicate whether transmission of the first request succeeded or failed, whether the first destination appears to be connected, or whether content in a first response 314 to the first request 310 matched reference content 332. In some examples, the first result can indicate that the first request successfully reached the first destination, that no response was received, or that the request did not reach the destination (e.g., due to gateway failure).

At block 508, a second result 320 is determined corresponding to the second request 312. This can be done as discussed above with reference to FIG. 3. Blocks 502-508 can be performed in any order provided block 502 precedes block 506 and block 504 precedes block 508.

At block 510, it is determined that the first result and the second result are inconsistent. This can be done as discussed above with reference to FIG. 3. In an example, the first result indicates a successful probe e.g., of a pin-holed responder 112, and the second result indicates an unsuccessful probe, e.g., of a responder 112 that is not pin-holed and is blocked by a captive portal.

At block 512, e.g., in response to the determining of inconsistency in block 510, a third request having a third destination is transmitted via the network interface. This can be done as discussed above with reference to FIG. 3. As discussed above, in some examples, the third destination can be either the first destination or the second destination, or the first destination, the second destination, and the third destination can all be different from each other.

At block 514, a third result is determined. The third result corresponds to the third request. This can be done as discussed above with reference to FIG. 3.

At block 516, a state of network connectivity of the network interface is determined. The state is determined based at least in part on the third result and at least one of the first result or the second result. This can be done as discussed above with reference to analyzing module 306, FIG. 3. For example, the state can be a state indicated by a majority of the results. Specifically, in some examples, block 516 can include determining that either the first result or the second result is consistent with the third result. The state of network connectivity can then be determined based at least in part on the third result and based at least in part on the result of the first result and the second result that is consistent with the third result. As discussed above, any number of requests can be transmitted and the state can be determined as the state indicated by a majority of the respective results.

In some examples above and other examples, a plurality of requests is used. In some examples, at block 518, multiple requests having respective destinations, e.g., requests of a plurality of requests, are transmitted via the network interface. Block 518 can include, e.g., blocks 502 and 504, and the plurality of requests can include the first request 310 and the second request 312.

At block 520, it is determined that respective results corresponding to the requests include at least some inconsistent results. Block 520 can include, e.g., blocks 506, 508, and 510. The results can include, e.g., the first result 318 and the second result 320. The at least some inconsistent results can include one or more of the respective results that differ from or are otherwise inconsistent with at least one other of the respective results. In some examples, at least a selected result of the respective results corresponding to the requests (e.g., the first result 318) indicates that the respective request (e.g., the first request 310) successfully reached the respective destination (e.g., the first destination).

At block 522, a further request having a respective destination is transmitted via the network interface. Block 522 can include, e.g., block 512, and the further request can include the third request 322. The respective destination of the further request can include, e.g., the third destination.

At block 524, a state of network connectivity of the network interface is determined based at least in part on a result corresponding to the further request and at least one of the inconsistent results. Block 524 can include, e.g., blocks 514 and 516. The result corresponding to the further request can include, e.g., the third result 326. The at least one of the inconsistent results can include, e.g., the first result 318 or the second result 320.

In some examples, block 520 can include determining that at least a selected result of the respective results corresponding to the requests is consistent with the result corresponding to the further request. For example, the first result 318 can be consistent with the third result 326. In some examples, block 524 can include determining the state of network connectivity based at least in part on the selected result and the result corresponding to the further request, e.g., the first result 318 and the third result 326. This can be done, e.g., as described above with reference to analyzing module 306.

Figure 6:
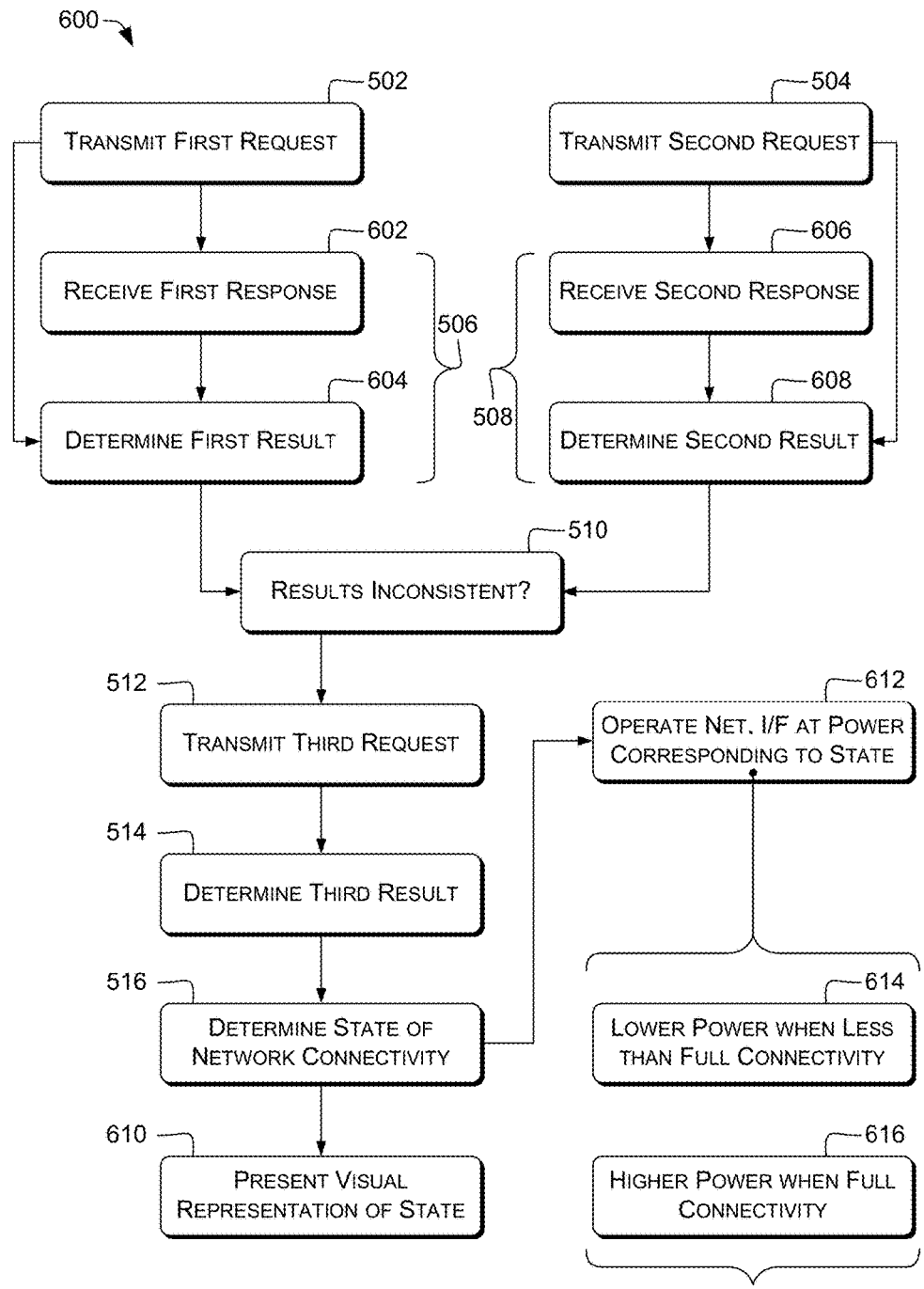
FIG. 6 is a flow diagram that illustrates example processes for determining or responding to a state of network connectivity of a network interface.

FIG. 6 illustrates example processes 600 for determining or responding to a state of network connectivity of a network interface. Block 506 can include blocks 602 and 604. Block 508 can include blocks 606 and 608. Block 516 can be followed by block 612. In some examples, functions of blocks 612-616 can be performed by power-control module 334. As shown, block 502 can be followed by block 602 or block 604. Block 504 can be followed by block 606 or block 608.

At block 602, a first response is received via the network interface. The first response corresponds to the first request. In some examples, the first response includes content, e.g., headers, body, or metadata, such as described above with reference to probing module 304, FIG. 3. The first response can be received from a responder 112 corresponding to the first destination, or from another computing device as discussed above with reference to probing module 304, FIG. 3.

At block 604, the first result is determined, e.g., based at least in part on the first response. This can be done as discussed above with reference to probing module 304, FIG. 3. In some examples, at block 604, content of the first response is compared to reference content to provide the first result indicating whether the content corresponds to the reference content. As discussed above, the reference content can be stored, e.g., in memory 122 or in a computer-readable storage medium. In some examples, one or more results can be determined based on respective responses and respective reference content, e.g., as described herein with reference to the first result. In some examples, the first result is determined based on factors in addition to or instead of the first response, e.g., timeouts or error messages, as discussed above with reference to probing module 304, FIG. 3.

In some examples, the first response can include an error message from a network subsystem of computing device 102 or a failure packet such as an internet control message protocol (ICMP) destination-host-unreachable message. In some of these examples, the first result can be determined corresponding to the error message or failure packet, or contents of either of those.

In some examples using at least blocks 518, 520, 522, or 524, block 602 can include receiving, via the network interface, a first response (e.g., first response 314) corresponding to a first request of the plurality of requests (e.g., first request 310). Block 604 can include determining the respective result of the results corresponding to the requests (e.g., the first result 318) based at least in part on the first response. This can be done, e.g., as discussed above with reference to probing module 304, FIG. 3.

In some examples, a first request of the plurality of requests (e.g., first request 310) comprises a selected resource name, e.g., as discussed above with reference to FIG. 5. Block 602 can include receiving, via the network interface, a first response (e.g., first response 314) corresponding to the first request. The first response can include content. Block 604 can include comparing the content to reference content to provide the respective result of the results corresponding to the requests (e.g., first result 318). The respective result can indicate whether the content corresponds to the reference content. This can be done, e.g., as discussed above with reference to reference content 332 or block 506.

At block 606, a second response is received via the network interface. The second response corresponds to the second request. This can be done as discussed above with reference to probing module 304, FIG. 3, or as for the first response as noted above with reference to block 602.

At block 608, the second result is determined, e.g., based at least in part on the second response. This can be done as discussed above with reference to probing module 304, FIG. 3, or as for the first result as noted above with reference to block 604.

In some examples, e.g., in which computing device 102 includes display device 414, block 516 can be followed by block 610. At block 610, a visual representation of the state of network connectivity can be presented on the display device 414. This can be done as discussed above with reference to FIG. 4 and to representation 330, FIG. 3.

In some examples, the computing device 102 includes a wireless network interface 410 and an antenna 106 connected to the wireless network interface 410. In some of these examples, block 516 can be followed by block 612.

At block 612, the wireless network interface 410 is operated at a power level corresponding to the state of network connectivity of the network interface. For example, the power level can be an "on" level when the state 328 indicates the network connectivity meets predetermined criteria. Criteria can be tested against the predetermined criteria, e.g., as described above with reference to analyzing module 306 and cache 342, FIG. 3. In another example, the power level can be an "off" or "standby" level when the state 328 indicates the network connectivity does not meet predetermined criteria. In some examples, block 612 can include blocks 614 and 616. Further examples of blocks 612-616 are discussed above with reference to power-control module 334, FIG. 3. Turning off the wireless network interface 410 can permit saving power, e.g., resulting in a savings of battery life. This can be useful in computing devices 102 such as low-power wireless routers, in which downstream (e.g., wireless) network service can be terminated when upstream (e.g., wireless or cable) network connectivity is not present or otherwise does not meet the predetermined criteria.

At block 614, the wireless network interface 410 is operated in a relatively lower-power mode in response to the state of network connectivity being a state of less than full connectivity. The state of less than full connectivity can include, e.g., a state that is not a state of full connectivity, or a state in which characteristics of network connectivity are outside selected ranges. The relatively lower-power mode can be, e.g., off, standby, sleep, or hibernation, or a mode in which the wireless network interface 410 only operates for a certain proportion of elapsed time, e.g., 0.5 s out of each second.

At block 616, the wireless network interface 410 is operated in a relatively higher-power mode in response to the state of network connectivity being a state of full connectivity. The state of full connectivity can include, e.g., a state of more than a threshold level of connectivity, or a state in which characteristics of network connectivity are within selected ranges. The relatively higher-power mode can be, e.g., on, a mode in which the wireless network interface 410 is active substantially all the time, or a mode in which the wireless network interface 410 operates for a higher proportion of elapsed time, e.g., 0.9 s out of each second.

Figure 7:
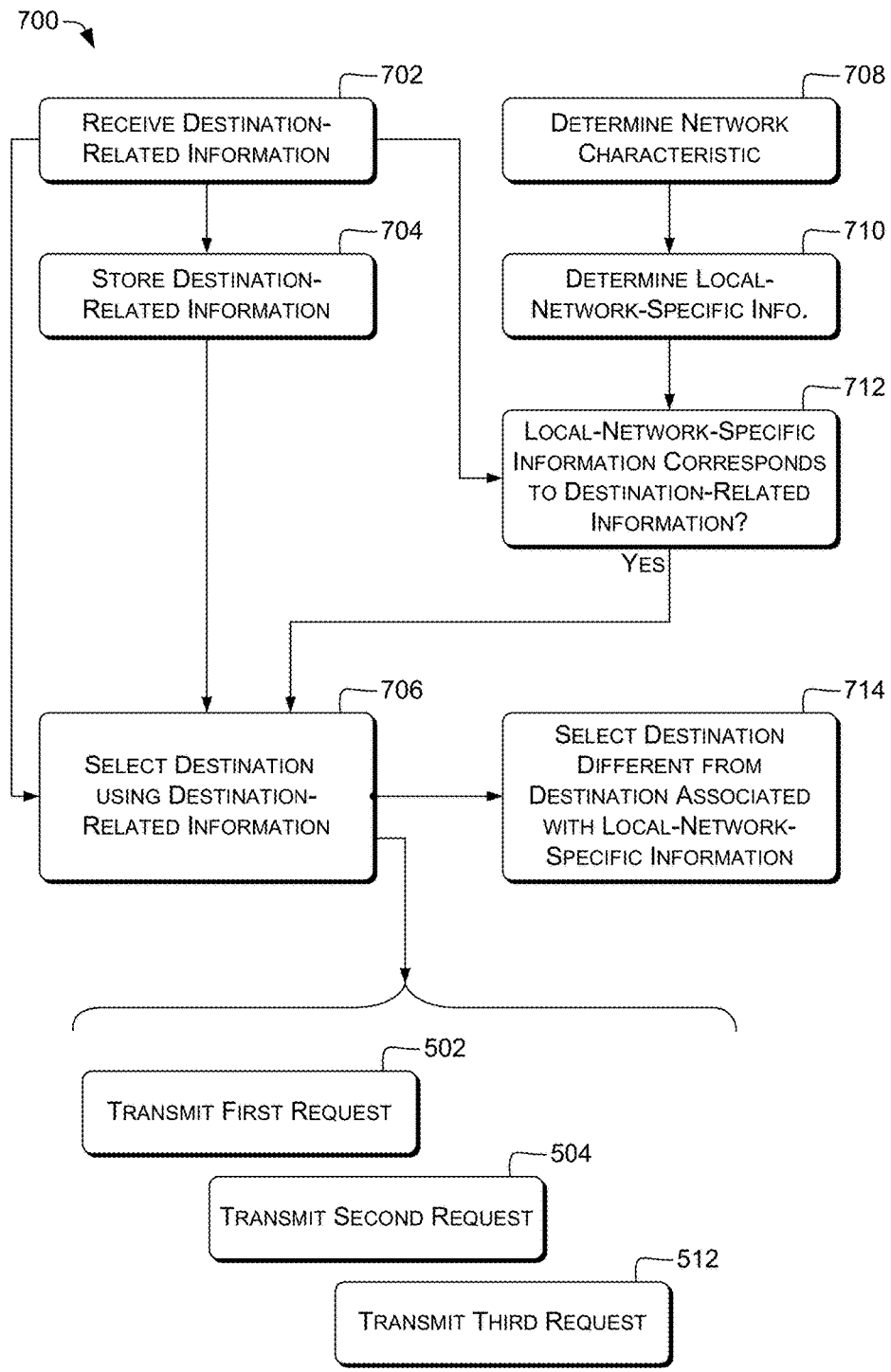
FIG. 7 is a flow diagram that illustrates an example process for determining a state of network connectivity of a network interface.

FIG. 7 illustrates an example process 700 for determining a state of network connectivity of a network interface. At least block 502, block 504, or block 512 can be preceded by at least block 702, block 704, or block 706.

At block 702, destination-related information is received via the network interface. Examples of destination-related information are discussed above with reference to responder registry 118 and FIG. 3.

At block 704, the received destination-related information is stored, e.g., in memory 122 or another computer-readable storage medium. For example, the destination-related information can be stored in a configuration table of an OS. Blocks 702 and 704 can be repeated, e.g., as part of an OS update cycle, so that computing device 102 has relatively recent destination-related information for use in attempting to determine a state 328 of network connectivity.

At block 706, a destination is selected based at least in part on destination-related information, e.g., the received destination-related information. The destination can be at least the first destination, the second destination, or the third destination. In some examples, the destination-related information can be retrieved from memory, e.g., from memory 122. This can be done as discussed above with reference to destination-determining module 302, FIG. 3.

In some examples, the destination-related information comprises first local-network-specific information (LNSI) associated with identification information of a particular destination. In some of these examples, block 706 can be preceded by (as shown) or include at least one of blocks 708-714. For example, block 706 can be preceded by blocks 708-712 and include block 714.

At block 708, the network interface is operated to determine a network characteristic, e.g., an SSID of a WIFI network. This can be done as discussed above with reference to reporting module 308, FIG. 3.

At block 710, second LNSI is determined based at least in part on the network characteristic. This can be done as discussed above with reference to reporting module 308, FIG. 3.

At block 712, the first LNSI is determined to correspond to the second LNSI. For example, the first LNSI and the second LNSI can correspond if, e.g., they are equal or one is contained within the other. Correspondence can be determined as discussed above with reference to destination-determining module 302, FIG. 3.

At block 714, a destination is selected to be different from the particular destination associated with the first LNSI. The destination can be at least the first destination, the second destination, or the third destination. The destination can be selected as discussed above with reference to destination-determining module 302, FIG. 3.

Figure 8:
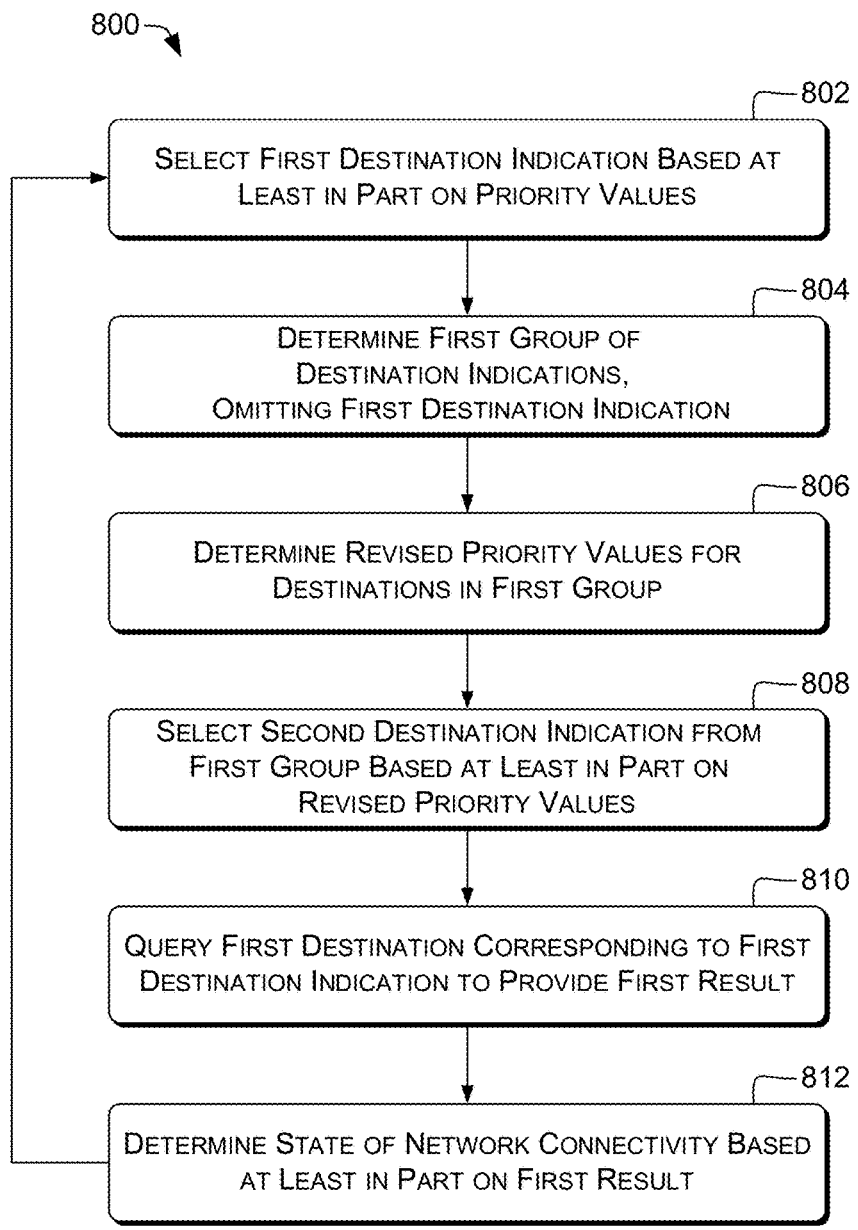
FIG. 8 is a flow diagram that illustrates an example process for determining a state of network connectivity of a network interface.

FIG. 8 illustrates an example process 800 for determining a state of network connectivity of a network interface.

At block 802, a first destination indication is selected from a plurality of destination indications. At least some destination indications of the plurality of destination indications correspond to respective priority values and the selecting is based at least in part on at least one of the priority values. This can be done, e.g., as discussed above with reference to destination-determining module 302, FIG. 3, and Tables 1 and 2.

At block 804, a first group of destination indications is determined. The destination indications of the first group are selected from the plurality of destination indications. The first group omits the first destination indication. This can be done, e.g., as discussed above with reference to destination-determining module 302, FIG. 3.

At block 806, respective revised priority values of at least one of the destination indications of the first group of destination indications are determined based at least in part on at least one of the priority values. This can be done, e.g., as discussed above with reference to destination-determining module 302, FIG. 3, and Table 2.

In some examples, block 806 can include determining the respective revised priority values by normalizing the respective priority values of the destination indications of the first group based at least in part on a sum of the respective priority values of the destination indications of the first group. This can be done, e.g., as discussed above with reference to destination-determining module 302, FIG. 3, and Tables 1 and 2.

At block 808, a second destination indication is selected from the first group of destination indications. The selection is based at least in part on the revised priority values. This can be done, e.g., as discussed above with reference to destination-determining module 302, FIG. 3.

At block 810, a first destination is queried via network interface 132. The first destination corresponds to the first destination indication. The querying provides a first result. In some examples, the querying the first destination comprises transmitting a first request to the first destination via the network interface. In some examples, the querying does not include performing a name lookup, or the first destination is not a nameserver. This can be done, e.g., as discussed above with reference to probing module 304, FIG. 3.

At block 812, a state of network connectivity of the network interface is determined based at least in part on the first result. This can be done, e.g., as discussed above with reference to analyzing module 306, FIG. 3.

In some examples, block 812 can be followed by block 802. This can permit, e.g., determining an updated state of network connectivity periodically, when network service changes, on a schedule, at the request of a user, or in other situations described below with reference to FIG. 10. In other examples, processing can terminate after block 812.

Figure 9:
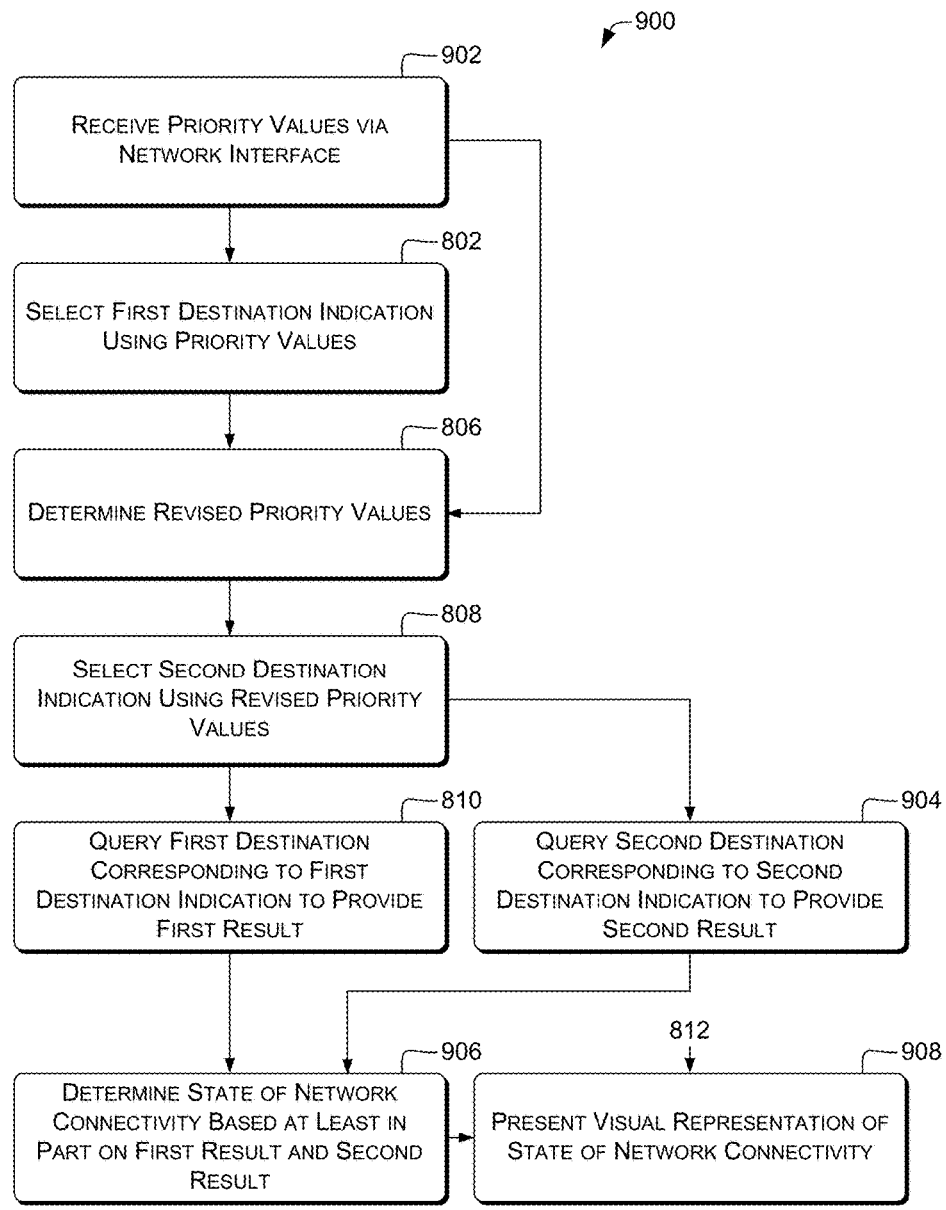
FIG. 9 is a flow diagram that illustrates an example process for determining a state of network connectivity of a network interface.

FIG. 9 illustrates an example process 900 for determining a state of network connectivity of a network interface. Block 812, FIG. 8, can include block 906 or can be followed by block 908. Blocks 802, 806, 812, or 906 can be preceded by block 902.

At block 902, respective priority values of the at least some destination indications are received via the network interface. This can be done, e.g., as discussed above with reference to destination-determining module 302, FIG. 3.

Block 902 can be followed by at least one of blocks 802-808. Block 808, selecting a second destination, can be followed by block 810 or block 904.

At block 904, the second destination is queried to provide a second result. The second destination corresponds to the second destination indication. In some examples, the querying the second destination comprises transmitting a second request to the second destination via the network interface. This can be done, e.g., as discussed above with reference to probing module 304, FIG. 3. Block 904, or block 810, can be followed by block 906.

At block 906, the state of network connectivity of the network interface is determined based at least in part on the first result and further based at least in part on the second result. This can be done, e.g., as discussed above with reference to analyzing module 306, FIG. 3.

At block 908, a visual representation of the state of network connectivity is presented on a display device 414. This can be done as discussed above with reference to FIG. 4 and to representation 330, FIG. 3.

Figure 10:
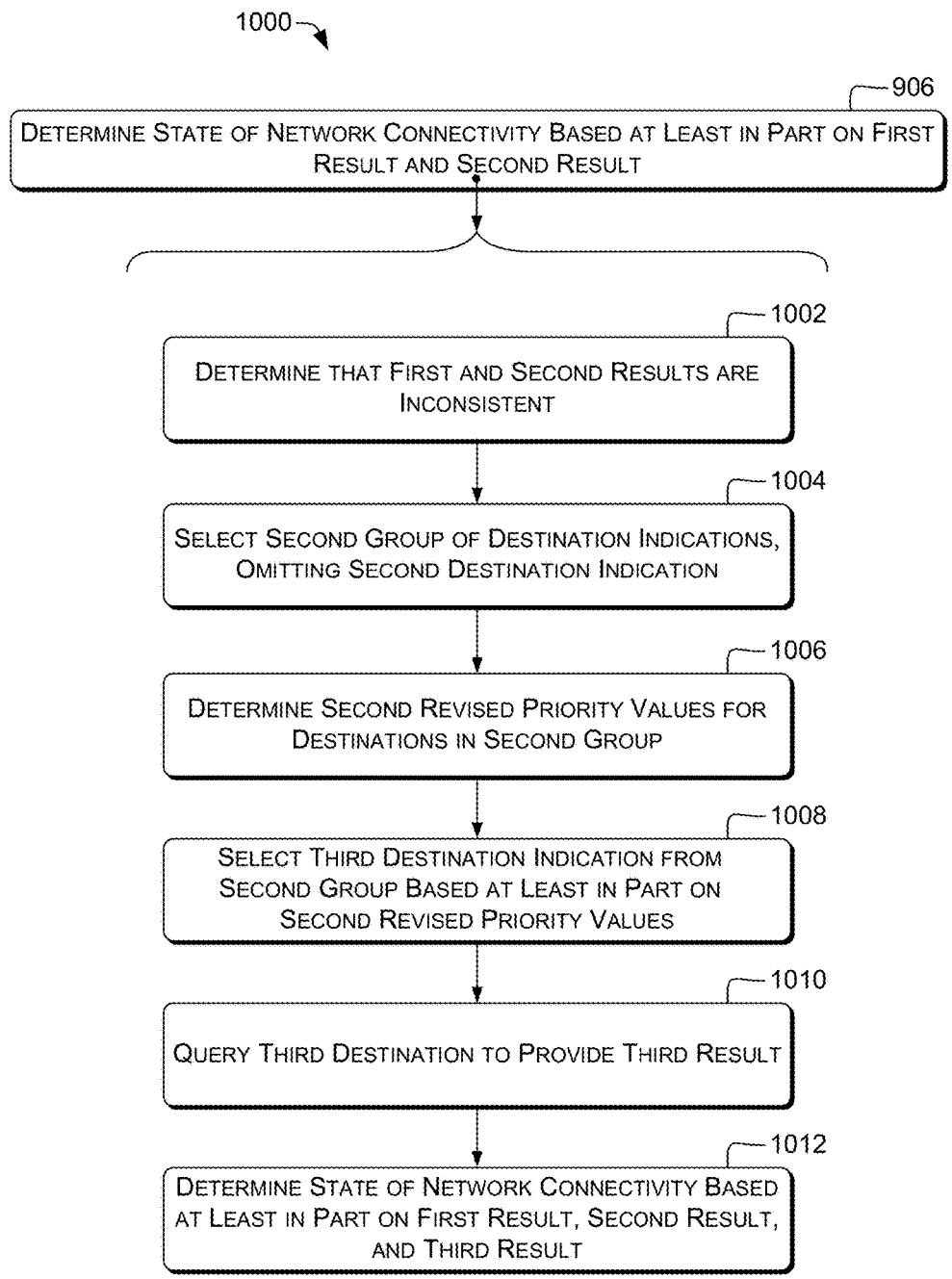
FIG. 10 is a flow diagram that illustrates an example process for determining a state of network connectivity of a network interface.

FIG. 10 illustrates an example process 1000 for determining a state of network connectivity of a network interface. In some examples, block 906, FIG. 9, includes blocks 1002-1012. In some examples, block 906 includes block 1012 and is preceded by blocks 1002-1010.

At block 1002, it is determined that the first result and the second result are inconsistent. This can be done, e.g., as discussed above with reference to analyzing module 306, FIG. 3.

At block 1004, a second group of destination indications is determined from among the first group of destination indications. The second group omits the second destination indication. Since the second group is determined from among the first group, the second group also omits the first destination indication in some examples. This can be done, e.g., as discussed above with reference to destination-determining module 302, FIG. 3.

At block 1006, respective second revised priority values of at least one of the destination indications of the second group of destination indications are determined based at least in part on at least one of the priority values or at least one of the revised priority values. This can be done, e.g., as discussed above with reference to destination-determining module 302, FIG. 3, and Tables 1 and 2.

At block 1008, a third destination indication is selected from the second group of destination indications. The selection is based at least in part on the second revised priority values. This can be done, e.g., as discussed above with reference to destination-determining module 302, FIG. 3, and Tables 1 and 2.

At block 1010, a third destination is queried to provide a third result. The third destination corresponds to the third destination indication. In some examples, the querying the third destination comprises transmitting a third request to the third destination via the network interface. This can be done, e.g., as discussed above with reference to probing module 304, FIG. 3.

At block 1012, the state of network connectivity of the network interface is determined further based at least in part on the third result. This can be done, e.g., as discussed above with reference to analyzing module 306, FIG. 3.

In some examples, one or more of the destination indications represent common destinations. In some examples, the first destination indication corresponds to a first network address and the second destination indication corresponds to the first network address. In some examples, the first destination indication corresponds to a second network address and the third destination indication corresponds to the second network address. In some examples, the second destination indication corresponds to a third network address and the third destination indication corresponds to the third network address.

Figure 11:
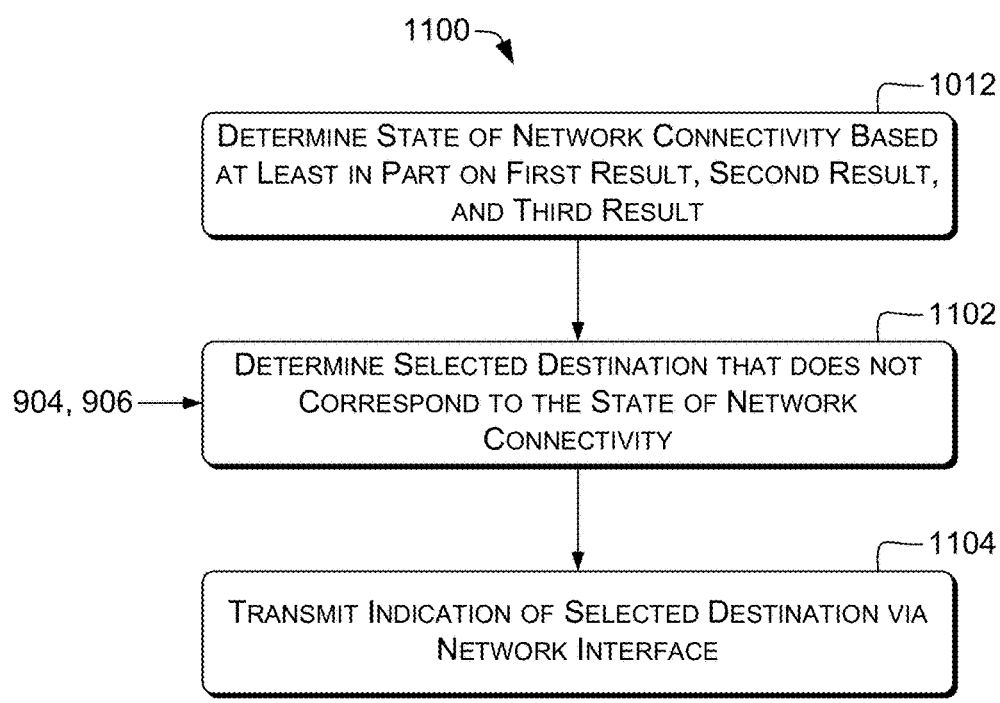
FIG. 11 is a flow diagram that illustrates an example process for responding to a determined state of network connectivity of a network interface.

FIG. 11 illustrates an example process 1100 for responding to a determined state of network connectivity of a network interface. Block 1012 can be followed by block 1102.

At block 1102, it is determined, based at least in part on at least the first result, the second result, or the third result, that a selected destination of the first, second, and third destinations does not correspond to the state of network connectivity. This can be done, e.g., as discussed above with reference to analyzing module 306, FIG. 3.

In some examples, block 1102 can include determining, based at least in part on at least the first result or the second result, that a selected destination of the first and second destinations does not correspond to the state of network connectivity. This can be done, e.g., as discussed above with reference to analyzing module 306, FIG. 3. In some of these examples, block 1102 can be preceded by block 904.

At block 1104, an indication of the selected destination is transmitted via the network interface (or another network interface). This can be done, e.g., as discussed above with reference to reporting module 308, FIG. 3. In some examples, an indication of the selected destination can additionally or alternatively be presented, e.g., on display device 414. This can be done as discussed above with reference to FIG. 4 and to representation 330, FIG. 3.

In some examples, e.g., as noted above, blocks 812, 908, 1012, or 1104, can be followed by block 802. In this way, above-described operations can be repeated to determine a second state of network connectivity of the network interface. The operations can be repeated, e.g., in response to a change in network service, or after a period of time has elapsed since determining the state of network connectivity. In some examples, the operations can be repeated for each of a plurality of network interfaces 132 of the computing device 102.

Figure 12:
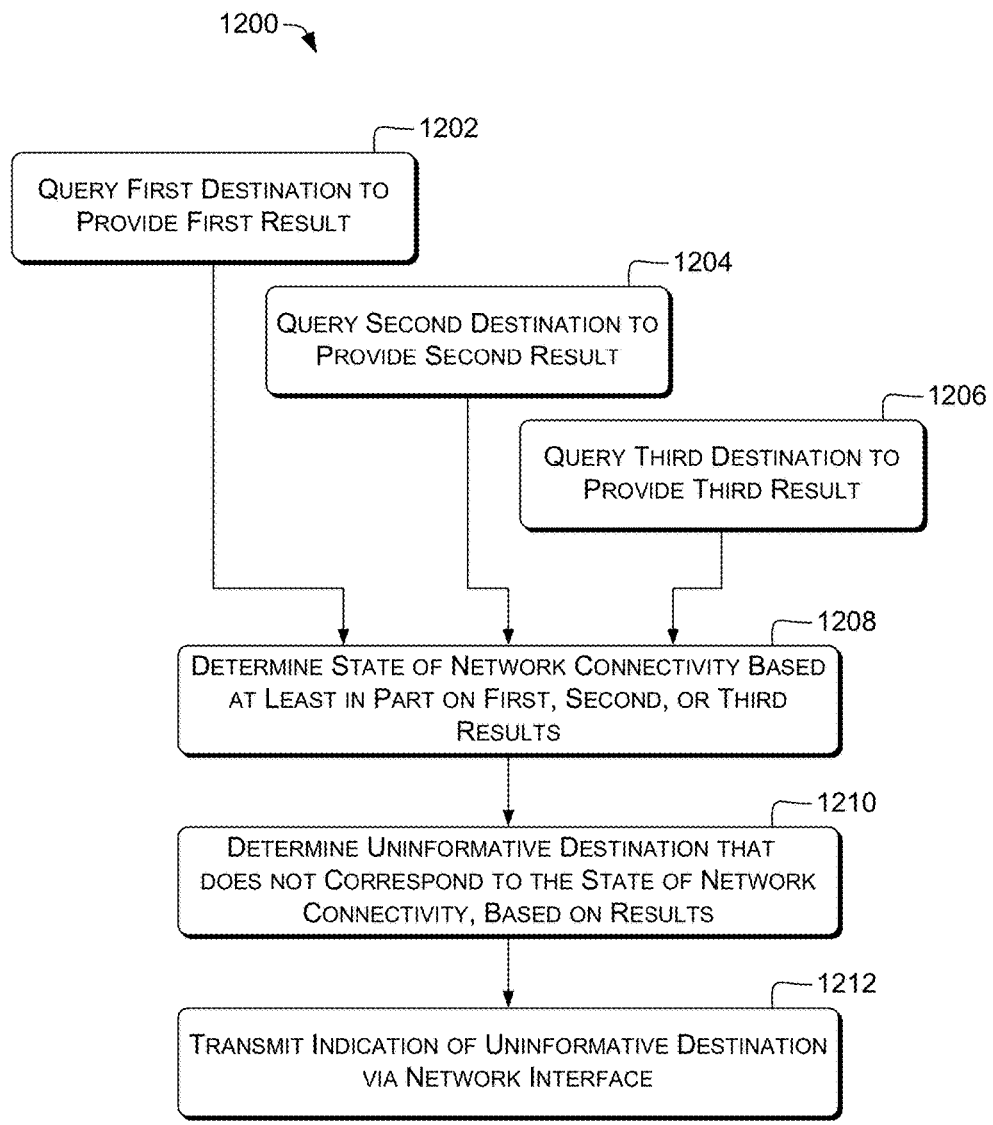
FIG. 12 is a flow diagram that illustrates an example process for determining and reporting a state of network connectivity of a network interface.

FIG. 12 illustrates an example process 1200 for determining and reporting a state of network connectivity of a network interface.

At block 1202, a first destination is queried to provide a first result. This can be done, e.g., as discussed above with reference to probing module 304, FIG. 3. In some examples, the querying the first destination does not include performing a name lookup, or the first destination is not a nameserver. Using queries other than name lookups or nameservers can reduce the bandwidth and time required to determine state 328, since name lookups or nameservers are often whitelisted even in captive-portal configurations.

At block 1204, a second destination is queried to provide a second result. This can be done, e.g., as discussed above with reference to probing module 304, FIG. 3.

At block 1206, a third destination is queried to provide a third result. This can be done, e.g., as discussed above with reference to probing module 304, FIG. 3.

At block 1208, a state of network connectivity, e.g., of a network interface, is determined based at least in part on at least the first result, the second result, or the third result. This can be done, e.g., as discussed above with reference to analyzing module 306, FIG. 3.

At block 1210, it is determined, based at least in part on at least the first result, the second result, or the third result, that a selected destination of the first, second, and third destinations does not correspond to the state of network connectivity, i.e., that the selected destination is an uninformative destination as described above. This determining be done, e.g., as discussed above with reference to analyzing module 306, FIG. 3.

At block 1212, an indication of the uninformative destination is transmitted via a network, e.g., via a network interface. This can be done, e.g., as discussed above with reference to reporting module 308, FIG. 3. In some examples, an indication of the uninformative destination can additionally or alternatively be presented, e.g., on display device 414. This can be done as discussed above with reference to FIG. 4 and to representation 330, FIG. 3.

Figure 13A:
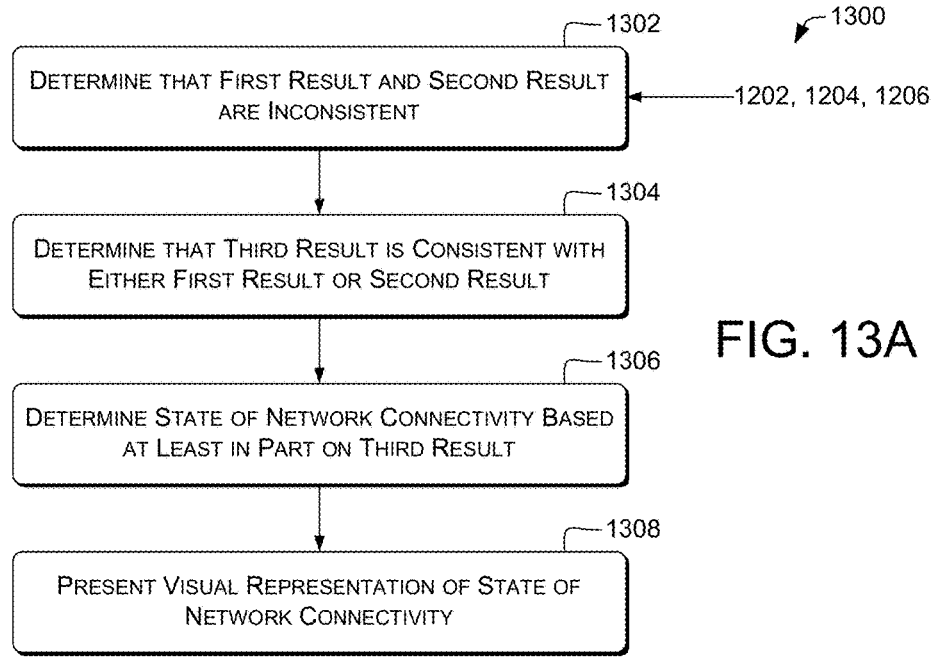
FIG. 13A is a flow diagram that illustrates an example process for determining and reporting a state of network connectivity of a network interface.
Figure 13B:
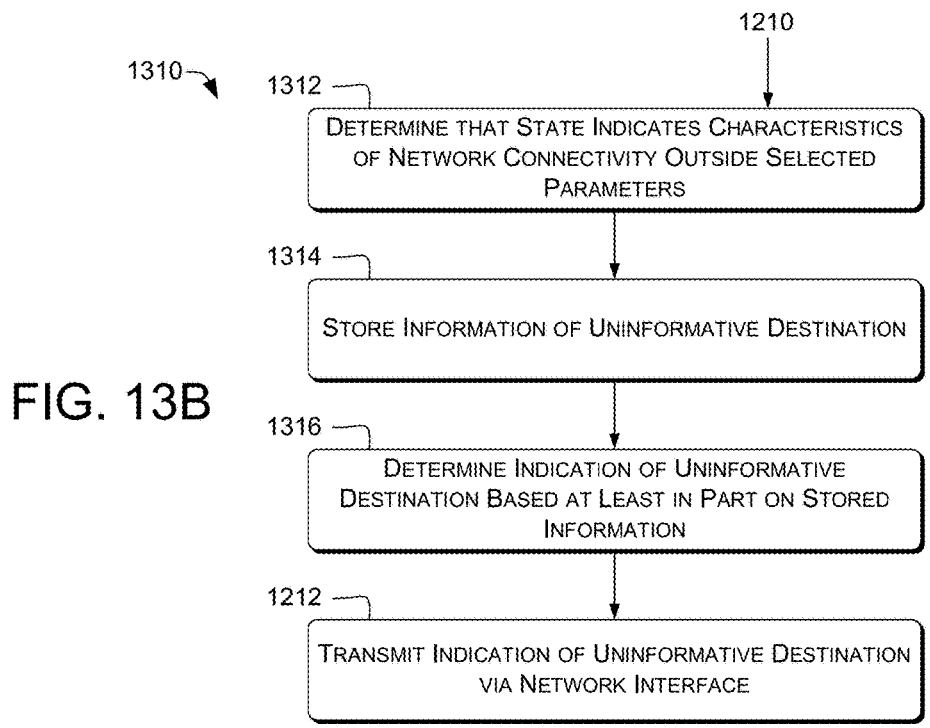
FIG. 13B is a flow diagram that illustrates an example process for determining and reporting a state of network connectivity of a network interface.

FIGS. 13A and 13B illustrates example processes for determining and reporting a state of network connectivity of a network interface. In some examples, block 1208 can include or be preceded by blocks 1302-1306. In some examples, block 1212 can include or be preceded by blocks 1312-1316. FIG. 13A shows an example process 1300.

At block 1302, e.g., following blocks 1202, 1204, or 1206, it is determined that the first result and the second result are inconsistent. This can be done, e.g., as discussed above with reference to analyzing module 306, FIG. 3.

At block 1304, it is determined that the third result is consistent with either the first result or the second result. This can be done, e.g., as discussed above with reference to analyzing module 306, FIG. 3. Consistency (here and throughout the document) can be determined according to meeting criteria for consistency, or to failing to meet criteria for inconsistency.

At block 1306, the state of network connectivity is determined based on the third result. This can be done, e.g., as discussed above with reference to analyzing module 306, FIG. 3. Block 1306 can include other functions such as those described above with reference to block 1208.

In some examples, at block 1308, a visual representation of the state of network connectivity is presented, e.g., on display device 414. This can be done as discussed above with reference to FIG. 4 and to representation 330, FIG. 3.

FIG. 4B shows an example process 1310.

At block 1312, e.g., after determining the uninformative destination in block 1210 or before transmitting the indication of the uninformative destination in block 1212, it is determined that the state of network connectivity indicates one or more characteristics of network connectivity outside (e.g., not conforming to or not within selected ranges of) selected parameters. For example, the state 328 can indicate that the relevant network interface is offline or that the relevant network interface has insufficient bandwidth or has excessive latency compared to the selected parameters. This can be done, e.g., as discussed above with reference to analyzing module 306, FIG. 3.

At block 1314, e.g., in response to the determination in block 1312 or at another time, information of the uninformative destination is stored in a computer storage medium to provide stored information. This can be done, e.g., as discussed above with reference to cache 342, FIG. 3.

At block 1316, e.g., once connectivity resumes, on a schedule, or at a predetermined time, the indication of the uninformative destination is determined based at least in part on the stored information. For example, the indication can be retrieved directly from the stored information. This can be done, e.g., as discussed above with reference to analyzing module 306 or cache 342, FIG. 3. Block 1316 can be followed by block 1212.

Figure 14A:
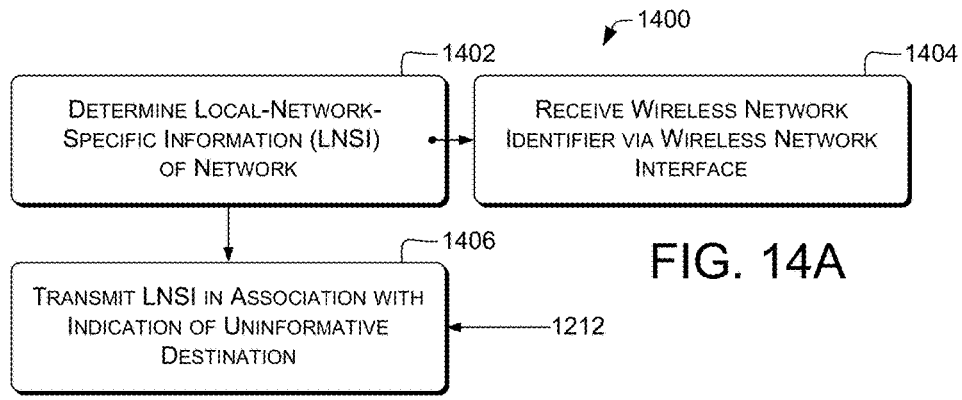
FIG. 14A is a flow diagram that illustrates an example process for reporting a state of network connectivity of a network interface.
Figure 14B:
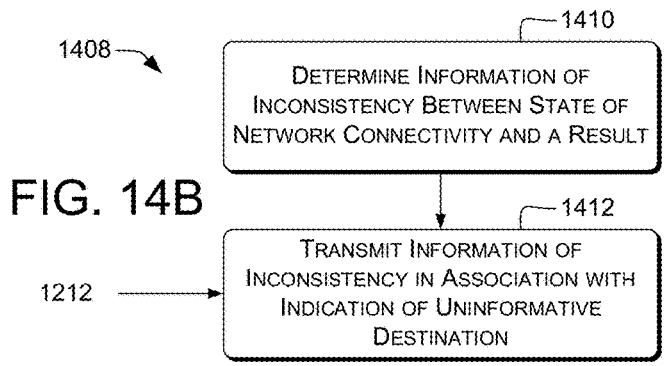
FIG. 14B is a flow diagram that illustrates an example process for reporting a state of network connectivity of a network interface.
Figure 14C:
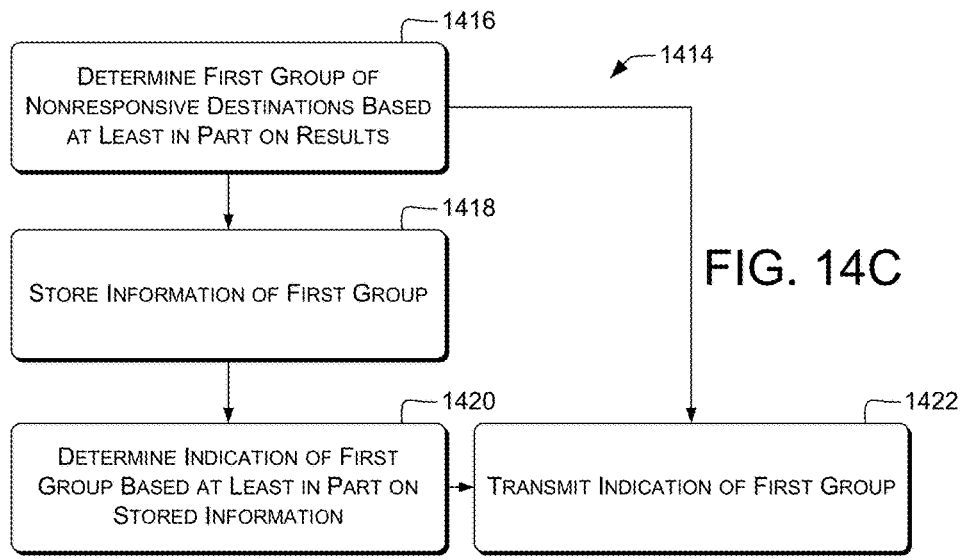
FIG. 14C is a flow diagram that illustrates an example process for reporting a state of network connectivity of a network interface.

FIGS. 14A-14C illustrates example processes for reporting a state of network connectivity of a network interface. In some examples, block 1212 can include block 1406 or block 1412, or can be preceded by one or more of blocks 1402-1412. In some examples, block 1206 can be followed by blocks 1416-1422.

FIG. 14A illustrates example process 1400. In some examples, local-network-specific information (LNSI) is transmitted in association with the indication. At block 1402, LNSI of the network is determined. This can be done, e.g., as discussed above with reference to reporting module 308, FIG. 3. The LNSI can correspond to particular network(s) 110 connected via specific network interface(s) 132. In some examples, block 1402 includes block 1404.

At block 1404, a wireless network identifier is received via a wireless network interface 410. This can be done, e.g., as discussed above with reference to reporting module 308, FIG. 3, or wireless network interface 410, FIG. 4. The wireless network identifier, e.g., an SSID, can be included in the LNSI. Additionally or alternatively, in some examples, at block 1404, a network identifier can be received via a network interface 132. For example, the network identifier can include a MICROSOFT WINDOWS domain name or a DNS domain name referencing a network (e.g., "example.com" for a computing device 102 having hostname "frodo.example.com").

At block 1406, the local-network-specific information is transmitted in association with the indication of the uninformative destination. This can be done, e.g., as discussed above with reference to reporting module 308, FIG. 3.

FIG. 14B illustrates example process 1408. In some examples, information of an inconsistency is transmitted in association with the indication. At block 1410, information of an inconsistency is determined. This can be done, e.g., as discussed above with reference to analyzing module 306, FIG. 3. The information can correspond to an inconsistency between the state of network connectivity and at least the first result, the second result, or the third result.

At block 1412, the information of the inconsistency is transmitted in association with the indication of the uninformative destination. This can be done, e.g., as discussed above with reference to reporting module 308, FIG. 3.

In some examples, at least block 1212, block 1406, or block 1412 can be combined in a single block or performed separately. For example, the indication, the LNSI, and the information of the inconsistency can be transferred in the same packet or network transmission, or in separate packets or separate network transmissions. In some examples, two of the three are sent in one packet and the other of the three is sent in a different packet.

FIG. 14B illustrates example process 1414. In some examples, nonresponsive destinations are determined. At block 1416, a first group of nonresponsive destinations of the first, second, and third destinations is determined based at least in part on at least the first, second, or third results. This can be done, e.g., as discussed above with reference to analyzing module 306, FIG. 3.

At block 1418, e.g., if network connectivity is not sufficient as described above with reference to block 1312, information of the first group is stored, e.g., in memory 122. This can be done, e.g., as discussed above with reference to cache 342, FIG. 3.

At block 1420, the indication of the first group is determined based at least in part on the stored information. This can be done, e.g., as discussed above with reference to reporting module 308, FIG. 3. For example, the indication can be retrieved from memory 122. Block 1420 can be performed, e.g., when network connectivity has become available or in other situations such as those described above with reference to block 1316.

At block 1422, an indication of the first group, e.g., the membership thereof, is transmitted via the network (e.g., via the network interface 132). This can be done, e.g., as discussed above with reference to reporting module 308, FIG. 3.

Figure 15:
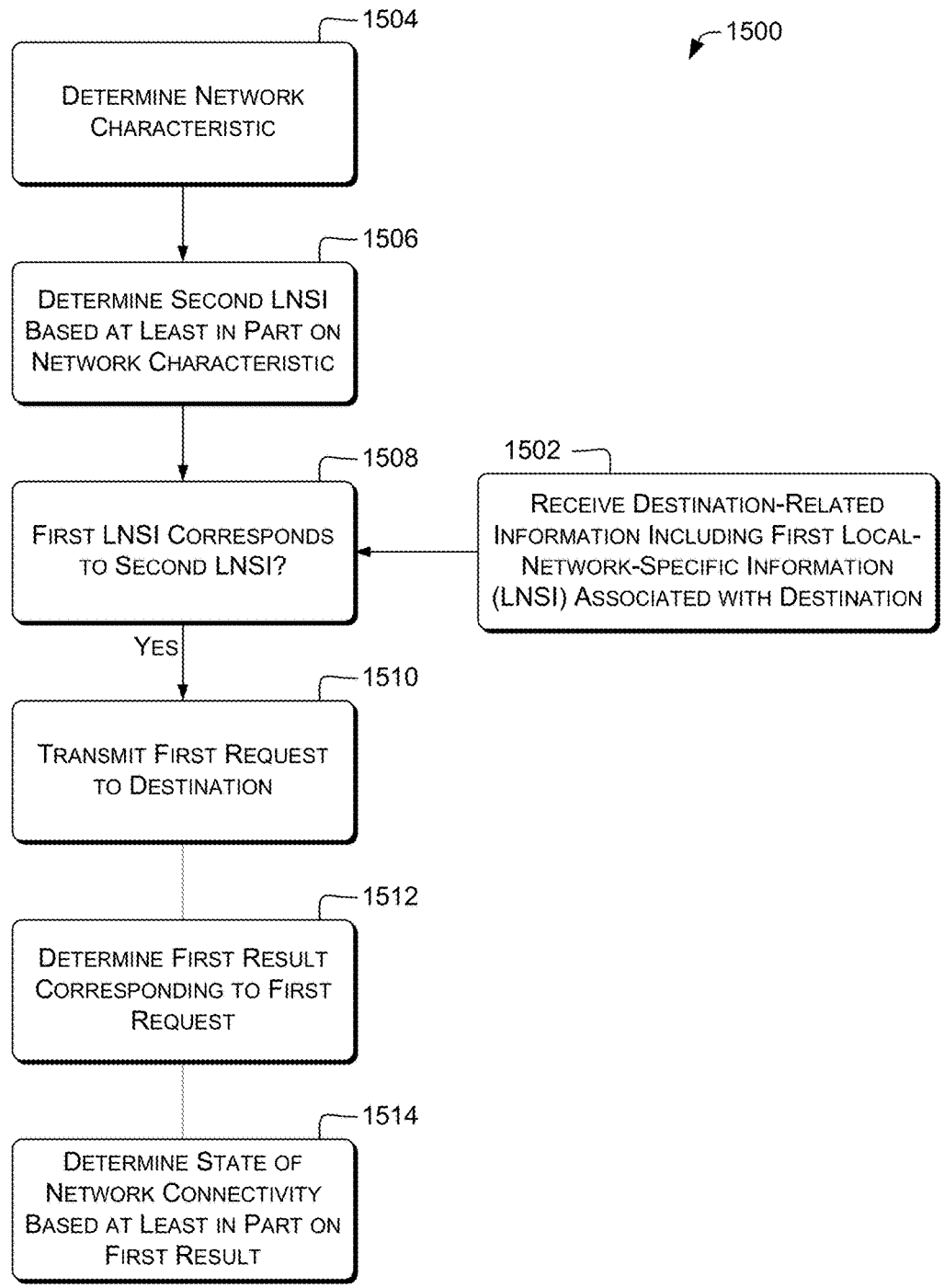
FIG. 15 is a flow diagram that illustrates an example process for determining a state of network connectivity of a network interface, e.g., connected to a known network.

FIG. 15 illustrates an example process 1500 for determining a state of network connectivity of a network interface. In some examples, process 1500 is used on known networks, e.g., networks having configurations in which predetermined responders 112 are known to reliably indicate the state 328 of network connectivity.

At block 1502, destination-related information is received, e.g., via network interface 132. Destination-related information can additionally or alternatively be provided, received, or determined, e.g., as described above with reference to destination-determining module 302, analyzing module 306, reporting module 308, block 702, or block 704. The destination-related information can include first local-network-specific information (LNSI) associated with identification information of a destination.

At block 1504, network interface 132 is operated to determine a network characteristic. This can be done as described above with reference to reporting module 308 or block 708. For example, the characteristic can include an SSID.

At block 1506, second LNSI is determined based at least in part on the network characteristic. This can be done, e.g., as discussed above with reference to destination-determining module 302, FIG. 3.

At block 1508, it is determined that the first LNSI corresponds to the second LNSI (or vice versa, and likewise throughout the document). This can be done, e.g., as discussed above with reference to destination-determining module 302, FIG. 3.

At block 1510, a first request is transmitted to the destination via the network interface. The destination is the destination indicated in the destination-related information as associated with the first LNSI. This can be done, e.g., as discussed above with reference to probing module 304, FIG. 3.

At block 1512, a first result is determined. The first result can correspond to the first request. For example, a first response 314 can be received and a first result 318 determined as described above with reference to FIG. 3. This can be done, e.g., as discussed above with reference to probing module 304, FIG. 3.

At block 1514, a state 328 of network connectivity of the network interface is determined based at least in part on the first result. This can be done, e.g., as discussed above with reference to analyzing module 306, FIG. 3. Determining state 328 based partly or wholly on the first result from the destination indicated in the destination-related information as associated with the first LNSI can permit determining state 328 with reduced bandwidth usage when on known networks, e.g., networks operated by known carriers.

EXAMPLE CLAUSES

A: A system comprising: at least one processor; a network interface communicatively coupled to the at least one processor; and a memory storing instructions that, when executed by the at least one processor, cause the at least one processor to perform operations comprising: transmitting, via the network interface, a first request having a first destination; transmitting, via the network interface, a second request having a second, different destination; determining a first result corresponding to the first request; determining a second result corresponding to the second request; determining that the first result and the second result are inconsistent; transmitting, via the network interface, a third request having a third destination; determining a third result corresponding to the third request; and determining, based at least in part on the third result and at least one of the first result or the second result, a state of network connectivity of the network interface.

B: The system as paragraph A recites, the operations further comprising: determining that either the first result or the second result is consistent with the third result; and determining the state of network connectivity based at least in part on the third result and based at least in part on the result of the first result and the second result that is consistent with the third result.

C: The system as paragraph A or B recites, wherein the first result indicates that the first request successfully reached the first destination.

D: A system as any of paragraphs A-C recites, the operations further comprising at least: receiving, via the network interface, a first response corresponding to the first request and determining the first result based at least in part on the first response; or receiving, via the network interface, a second response corresponding to the second request and determining the second result based at least in part on the second response.

E: A system as any of paragraphs A-D recites, further comprising: a wireless network interface; and an antenna communicatively coupled to the wireless network interface; wherein the operations further comprise operating the wireless network interface at a power level corresponding to the state of network connectivity of the network interface.

F: A system as paragraph E recites, wherein the operations further comprise: operating the wireless network interface in a relatively lower-power mode in response to the state of network connectivity being a state of less than full connectivity; and operating the wireless network interface in a relatively higher-power mode in response to the state of network connectivity being a state of full connectivity.

G: A system as any of paragraphs A-F recites, further comprising a cable jack communicatively coupled to the network interface.

H: A system as any of paragraphs A-G recites, wherein the first request comprises a selected resource name and the operations further comprise: receiving, via the network interface, a first response corresponding to the first request, the first response including content; and comparing the content to reference content to provide the first result indicating whether the content corresponds to the reference content.

I: A system as paragraph H recites, wherein the reference content is stored in the memory.

J: A system as paragraph H or I recites, wherein the reference content is stored in a computer-readable medium, e.g., a computer-readable storage medium.

K: A system as any of paragraphs A-J recites, the operations further comprising: selecting at least the first destination, the second destination, or the third destination based at least in part on destination-related information.

L: A system as paragraph K recites, the operations further comprising receiving the destination-related information via the network interface.

M: A system as paragraph K or L recites, the operations further comprising storing the destination-related information in a memory.

N: A system as any of paragraphs K-M recites, wherein the destination-related information comprises first localnetwork-specific information (LNSI) associated with identification information of a destination, and the operations further comprise: operating the network interface to determine a network characteristic; determining second LNSI based at least in part on the network characteristic; determining that the first LNSI corresponds to the second LNSI; and selecting at least the first destination, the second destination, or the third destination to be different from the destination.

O: A system as any of paragraphs A-N recites, wherein the third destination is either the first destination or the second destination.

P: A system as any of paragraphs A-O recites, wherein the first destination, the second destination, and the third destination are all different from one another.

Q: A system as any of paragraphs A-P recites, further comprising a display device, wherein the operations further comprise presenting, on the display device, a visual representation of the state of network connectivity.

R: A system as any of paragraphs A-Q recites, wherein the first request does not include a name lookup, or the first destination is not a nameserver.

S: A method, comprising, under control of a processor: selecting a first destination indication of a plurality of destination indications, wherein at least some destination indications of the plurality of destination indications correspond to respective priority values and the selecting is based at least in part on at least one of the priority values; determining a first group of destination indications of the plurality of destination indications, the first group omitting the first destination indication; determining respective revised priority values of at least one of the destination indications of the first group of destination indications based at least in part on at least one of the priority values; selecting a second destination indication from the first group of destination indications based at least in part on the revised priority values; querying, via a network interface communicatively coupled with the processor, a first destination corresponding to the first destination indication to provide a first result; and determining a state of network connectivity of the network interface based at least in part on the first result.

T: A method as paragraph S recites, further comprising: querying a second destination corresponding to the second destination indication to provide a second result; and determining the state of network connectivity of the network interface further based at least in part on the second result.

U: A method as paragraph T recites, further comprising: determining, based at least in part on at least the first result or the second result, that a selected destination of the first and second destinations does not correspond to the state of network connectivity; and transmitting an indication of the selected destination via the network interface.

V: A method as paragraph T or U recites, further comprising: determining that the first result and the second result are inconsistent; determining a second group of destination indications of the first group of destination indications, the second group omitting the second destination indication; determining respective second revised priority values of at least one of the destination indications of the second group of destination indications based at least in part on at least one of the priority values or at least one of the revised priority values; and selecting a third destination indication from the second group of destination indications based at least in part on the second revised priority values.

W: A method as paragraph V recites, further comprising: querying a third destination corresponding to the third destination indication to provide a third result; and determining the state of network connectivity of the network interface further based at least in part on the third result.

X: A method as paragraph W recites, wherein: the querying the first destination comprises transmitting a first request to the first destination via the network interface; the querying the second destination comprises transmitting a second request to the second destination via the network interface; and the querying the third destination comprises transmitting a third request to the third destination via the network interface.

Y: A method as paragraph W or X recites, further comprising: determining, based at least in part on at least the first result, the second result, or the third result, that a selected destination of the first, second, and third destinations does not correspond to the state of network connectivity; and transmitting an indication of the selected destination via the network interface.

Z: A method as any of paragraphs W-Y recites, wherein: the first destination indication corresponds to a first network address and the second destination indication corresponds to the first network address; the first destination indication corresponds to a second network address and the third destination indication corresponds to the second network address; or the second destination indication corresponds to a third network address and the third destination indication corresponds to the third network address.

AA: A method as any of paragraphs S-Z recites, further comprising: determining the respective revised priority values by normalizing the respective priority values of the destination indications of the first group based at least in part on a sum of the respective priority values of the destination indications of the first group.

AB: A method as any of paragraphs S-AA recites, further comprising: receiving, via the network interface, respective priority values of the at least some destination indications.

AC: A method as any of paragraphs S-AB recites, further comprising presenting, on a display device, a visual representation of the state of network connectivity.

AD: A method as any of paragraphs S-AC recites, wherein the querying does not include performing a name lookup, or the first destination is not a nameserver.

AE: A method as any of paragraphs S-AD recites, further comprising repeating the steps of any of paragraphs S-AD to determine a second state of network connectivity of the network interface.

AF: A computer-readable medium, e.g., a computer storage medium, having thereon computer-executable instructions, the computer-executable instructions upon execution configuring a computer to perform operations as any of paragraphs S-AE recites.

AG: A device comprising: a processor; and a computer-readable medium, e.g., a computer storage medium, having thereon computer-executable instructions, the computer-executable instructions upon execution by the processor configuring the device to perform operations as any of paragraphs S-AE recites.

AH: A system comprising: means for processing; and means for storing having thereon computer-executable instructions, the computer-executable instructions including means to configure the system to carry out a method as any of paragraphs S-AE recites.

AI: A system comprising: means for selecting a first destination indication of a plurality of destination indications, wherein at least some destination indications of the plurality of destination indications correspond to respective priority values and the means for selecting is configured to perform the selecting based at least in part on at least one of the priority values; means for determining a first group of destination indications of the plurality of destination indications, the first group omitting the first destination indication; means for determining respective revised priority values of at least one of the destination indications of the first group of destination indications based at least in part on at least one of the priority values; means for selecting a second destination indication from the first group of destination indications based at least in part on the revised priority values; means for querying, via a network interface communicatively coupled with the processor, a first destination corresponding to the first destination indication to provide a first result; and means for determining a state of network connectivity of the network interface based at least in part on the first result.

AJ: At least one computer-readable medium, e.g., a computer storage medium, storing computer-executable instructions that, when executed by at least one processor of a computer, configure the computer to perform acts comprising: querying a first destination to provide a first result; querying a second destination to provide a second result; querying a third destination to provide a third result; determining a state of network connectivity based at least in part on at least the first result, the second result, or the third result; determining, based at least in part on at least the first result, the second result, or the third result, that a selected destination of the first, second, and third destinations does not correspond to the state of network connectivity; and transmitting an indication of the selected destination via a network.

AK: The at least one computer-readable medium as paragraph AJ recites, the acts further comprising, before transmitting the indication of the selected destination: determining that the state of network connectivity indicates one or more characteristics of network connectivity outside selected parameters; storing information of the selected destination in a computer storage medium to provide stored information; and determining the indication of the selected destination based at least in part on the stored information.

AL: The at least one computer-readable medium as paragraph AJ or AK recites, the acts further comprising: determining local-network-specific information of the network; and transmitting the local-network-specific information in association with the indication of the selected destination.

AM: The at least one computer-readable medium as paragraph AL recites, wherein the local-network-specific information includes a wireless network identifier and the acts further comprise receiving the wireless network identifier via a wireless network interface.

AN: The at least one computer-readable medium as any of paragraphs AJ-AM recites, the acts further comprising: determining information of an inconsistency between the state of network connectivity and at least the first result, the second result, or the third result; and transmitting the information of the inconsistency in association with the indication of the selected destination.

AO: The at least one computer-readable medium as any of paragraphs AJ-AN recites, the acts further comprising: determining, based at least in part on at least the first result, the second result, or the third result, a first group of nonresponsive destinations of the first, second, and third destinations; and transmitting an indication of the first group via the network.

AP: The at least one computer-readable medium as paragraph AO recites, the acts further comprising: storing information of the first group; and determining the indication of the first group based at least in part on the stored information.

AQ: The at least one computer-readable medium as any of paragraphs AJ-AP recites, the acts further comprising: determining that the first result and the second result are inconsistent; determining that the third result is consistent with either the first result or the second result; and determining the state of network connectivity based on the third result.

AR: The at least one computer-readable medium as any of paragraphs AJ-AQ recites, the acts further comprising presenting, on a display device, a visual representation of the state of network connectivity.

AS: The at least one computer-readable medium as any of paragraphs AJ-AR recites, wherein the querying the first destination does not include performing a name lookup, or the first destination is not a nameserver.

AT: A computer-implemented method, comprising: receiving destination-related information comprising first local-network-specific information (LNSI) associated with identification information of a destination; operating a network interface to determine a network characteristic; determining second LNSI based at least in part on the network characteristic; determining that the first LNSI corresponds to the second LNSI; transmitting, via the network interface, a first request to the destination; determining a first result corresponding to the first request; and determining, based at least in part on the first result, a state of network connectivity of the network interface.

AU: A computer-readable medium, e.g., a computer storage medium, having thereon computer-executable instructions, the computer-executable instructions upon execution configuring a computer to perform operations as paragraph AT recites.

AV: A device comprising: a processor; and a computer-readable medium, e.g., a computer storage medium, having thereon computer-executable instructions, the computer-executable instructions upon execution by the processor configuring the device to perform operations as paragraph AT recites.

AW: A system comprising: means for processing; and means for storing having thereon computer-executable instructions, the computer-executable instructions including means to configure the system to carry out a method as paragraph AT recites.

AX: A system comprising: means for receiving destination-related information comprising first local-network-specific information (LNSI) associated with identification information of a destination; means for operating a network interface to determine a network characteristic; means for determining second LNSI based at least in part on the network characteristic; means for determining that the first LNSI corresponds to the second LNSI; means for transmitting, via the network interface, a first request to the destination; means for determining a first result corresponding to the first request; and means for determining, based at least in part on the first result, a state of network connectivity of the network interface.

AY: A system comprising: at least one processor; a network interface communicatively coupled to the at least one processor; and a memory storing instructions that, when executed by the at least one processor, cause the at least one processor to perform operations comprising: transmitting, via the network interface, a plurality of requests having respective destinations; determining that respective results corresponding to the requests include at least some inconsistent results; transmitting, via the network interface, a further request having a respective destination; and determining a state of network connectivity of the network interface based at least in part on a result corresponding to the further request and at least one of the inconsistent results.

AZ: The system as paragraph AY recites, the operations further comprising: determining that at least a selected result of the respective results corresponding to the requests is consistent with the result corresponding to the further request; and determining the state of network connectivity based at least in part on the selected result and the result corresponding to the further request.

BA: The system as paragraph AY or AZ recites, wherein at least a selected result of the respective results corresponding to the requests indicates that the respective request successfully reached the respective destination.

BB: A system as any of paragraphs AY-BA recites, the operations further comprising receiving, via the network interface, a first response corresponding to a first request of the plurality of requests and determining the respective result of the results corresponding to the requests based at least in part on the first response.

BC: A system as any of paragraphs AY-BB recites, further comprising: a wireless network interface; and an antenna communicatively coupled to the wireless network interface; wherein the operations further comprise operating the wireless network interface at a power level corresponding to the state of network connectivity of the network interface.

BD: A system as any of paragraphs AY-BC recites, wherein a first request of the plurality of requests comprises a selected resource name and the operations further comprise: receiving, via the network interface, a first response corresponding to the first request, the first response including content; and comparing the content to reference content to provide the respective result of the results corresponding to the requests, wherein the respective result indicates whether the content corresponds to the reference content.

CONCLUSION

Connectivity-detection techniques described herein can provide more reliable detection of a state of network connectivity. Some examples herein can permit the use of multiple responders, e.g., servers of a CDN, reducing load on any individual responder and improving scalability of the probing.

Although connectivity detection has been described in language specific to structural features or methodological steps, it is to be understood that the invention defined in the appended claims is not necessarily limited to the specific features or steps described. Rather, the specific features and steps are disclosed as preferred forms of implementing the claimed invention.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing device(s) 102, such as one or more internal or external CPUs or GPUs, or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage medium. Some or all of the methods can alternatively be embodied in specialized computer hardware.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. Conjunctive language such as the phrases "at least one of X, Y or Z" or "at least X, Y, or Z," unless specifically stated otherwise, is to be understood to present that an item, term, etc., can be either X, Y, or Z, or a combination thereof.

Any routine descriptions, elements or blocks in the flow diagrams described herein or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:
1. A system comprising:
   at least one processor;
   a network interface communicatively coupled to the at least one processor; and
   a memory storing instructions that, when executed by the at least one processor, cause the at least one processor to perform operations comprising:
   transmitting, via the network interface, a plurality of requests having respective destinations;
   determining that respective results corresponding to the requests include at least some inconsistent results;
   transmitting, via the network interface, a further request having a respective destination; and
   determining a state of network connectivity of the network interface based at least in part on a result corresponding to the further request and at least one of the inconsistent results.

2. The system as claim 1 recites, the operations further comprising:
   determining that at least a selected result of the respective results corresponding to the requests is consistent with the result corresponding to the further request; and
   determining the state of network connectivity based at least in part on the selected result and the result corresponding to the further request.

3. The system as claim 1 recites, wherein at least a selected result of the respective results corresponding to the requests indicates that the respective request successfully reached the respective destination.

4. A system as claim 1 recites, the operations further comprising receiving, via the network interface, a first response corresponding to a first request of the plurality of requests and determining the respective result of the results corresponding to the requests based at least in part on the first response.

5. A system as claim 1 recites, further comprising:
   a wireless network interface; and
   an antenna communicatively coupled to the wireless network interface;
   wherein the operations further comprise operating the wireless network interface at a power level corresponding to the state of network connectivity of the network interface.

6. A system as claim 1 recites, wherein a first request of the plurality of requests comprises a selected resource name and the operations further comprise:
   receiving, via the network interface, a first response corresponding to the first request, the first response including content; and
   comparing the content to reference content to provide the respective result of the results corresponding to the requests, wherein the respective result indicates whether the content corresponds to the reference content.

7. A method, comprising, under control of a processor:
   selecting a first destination indication of a plurality of destination indications, wherein at least some destination indications of the plurality of destination indications correspond to respective priority values and the selecting is based at least in part on at least one of the priority values;
   determining a first group of destination indications of the plurality of destination indications, the first group omitting the first destination indication;
   determining respective revised priority values of at least one of the destination indications of the first group of destination indications based at least in part on at least one of the priority values;
   selecting a second destination indication from the first group of destination indications based at least in part on the revised priority values;
   querying, via a network interface communicatively coupled with the processor, a first destination corresponding to the first destination indication to provide a first result; and
   determining a state of network connectivity of the network interface based at least in part on the first result.

8. A method as claim 7 recites, further comprising:
   querying a second destination corresponding to the second destination indication to provide a second result; and
   determining the state of network connectivity of the network interface further based at least in part on the second result.

9. A method as claim 8 recites, further comprising:
   determining that the first result and the second result are inconsistent;
   determining a second group of destination indications of the first group of destination indications, the second group omitting the second destination indication;
   determining respective second revised priority values of at least one of the destination indications of the second group of destination indications based at least in part on at least one of the priority values or at least one of the revised priority values; and
   selecting a third destination indication from the second group of destination indications based at least in part on the second revised priority values.

10. A method as claim 9 recites, further comprising:
    querying a third destination corresponding to the third destination indication to provide a third result; and
    determining the state of network connectivity of the network interface further based at least in part on the third result.

11. A method as claim 10 recites, wherein:
    the first destination indication corresponds to a first network address and the second destination indication corresponds to the first network address;
    the first destination indication corresponds to a second network address and the third destination indication corresponds to the second network address; or
    the second destination indication corresponds to a third network address and the third destination indication corresponds to the third network address.

12. A method as claim 7 recites, further comprising:
    determining the respective revised priority values by normalizing the respective priority values of the destination indications of the first group based at least in part on a sum of the respective priority values of the destination indications of the first group.

13. A method as claim 7 recites, further comprising:
    receiving, via the network interface, respective priority values of the at least some destination indications.

14. At least one computer-readable medium storing computer-executable instructions that, when executed by at least one processor of a computer, configure the computer to perform acts comprising:
    querying a first destination to provide a first result;
    querying a second destination to provide a second result;
    querying a third destination to provide a third result;
    determining a state of network connectivity based at least in part on at least the first result, the second result, or the third result;
    determining, based at least in part on at least the first result, the second result, or the third result, that a selected destination of the first, second, and third destinations does not correspond to the state of network connectivity; and
    transmitting an indication of the selected destination via a network.

15. The at least one computer-readable medium as claim 14 recites, the acts further comprising, before transmitting the indication of the selected destination:
    determining that the state of network connectivity indicates one or more characteristics of network connectivity outside selected parameters;
    storing information of the selected destination in a computer storage medium to provide stored information; and
    determining the indication of the selected destination based at least in part on the stored information.

16. The at least one computer-readable medium as claim 14 recites, the acts further comprising:
- determining local-network-specific information of the network; and
- transmitting the local-network-specific information in association with the indication of the selected destination.

17. The at least one computer-readable medium as claim 16 recites, wherein the local-network-specific information includes a wireless network identifier and the acts further comprise receiving the wireless network identifier via a wireless network interface.

18. The at least one computer-readable medium as claim 14 recites, the acts further comprising:
- determining information of an inconsistency between the state of network connectivity and at least the first result, the second result, or the third result; and
- transmitting the information of the inconsistency in association with the indication of the selected destination.

19. The at least one computer-readable medium as claim 14 recites, the acts further comprising:
- determining, based at least in part on at least the first result, the second result, or the third result, a first group of nonresponsive destinations of the first, second, and third destinations; and
- transmitting an indication of the first group via the network.

20. The at least one computer-readable medium as claim 14 recites, the acts further comprising:
- determining that the first result and the second result are inconsistent;
- determining that the third result is consistent with either the first result or the second result; and
- determining the state of network connectivity based on the third result.

* * * * *